US012647995B2

(12) United States Patent
Huang et al.

(10) Patent No.: US 12,647,995 B2
(45) Date of Patent: *Jun. 2, 2026

(54) TRANSMISSION APPARATUS AND TRANSMISSION METHOD OF RESOURCE ASSIGNMENT INFORMATION

(71) Applicant: Panasonic Intellectual Property Management Co., Ltd., Osaka (JP)

(72) Inventors: Lei Huang, Singapore (SG); Hong Cheng Michael Sim, Singapore (SG); Yoshio Urabe, Nara (JP); Isamu Yoshii, Chiba (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/904,753

(22) Filed: Oct. 2, 2024

(65) Prior Publication Data

US 2025/0031214 A1    Jan. 23, 2025

Related U.S. Application Data

(63) Continuation of application No. 18/528,324, filed on Dec. 4, 2023, now Pat. No. 12,144,005, which is a
(Continued)

(30) Foreign Application Priority Data

| | | |
|---|---|---|
| Jul. 1, 2015 | (JP) | 2015-132790 |
| Aug. 31, 2015 | (JP) | 2015-170508 |
| Nov. 4, 2015 | (JP) | 2015-216775 |

(51) Int. Cl.
*H04W 72/23* (2023.01)
*H04J 11/00* (2006.01)
(Continued)

(52) U.S. Cl.
CPC ......... *H04W 72/23* (2023.01); *H04J 11/0069* (2013.01); *H04L 1/0046* (2013.01);
(Continued)

(58) Field of Classification Search
CPC . H04W 72/042; H04W 20/24; H04W 74/004; H04J 11/0069; H04L 1/0046;
(Continued)

(56) References Cited

U.S. PATENT DOCUMENTS

| | | |
|---|---|---|
| 9,871,683 B2 | 1/2018 | Choi et al. |
| 10,305,643 B2 * | 5/2019 | Kim ...................... H04L 5/0053 |

(Continued)

FOREIGN PATENT DOCUMENTS

| | | |
|---|---|---|
| CN | 102948123 A | 2/2013 |
| CN | 103329474 A | 9/2013 |

(Continued)

OTHER PUBLICATIONS

IEEE 802.11-14/0649r1, "802.11ax Timeline Scenarios", May 12, 2014. (8 pages).
(Continued)

*Primary Examiner* — Habte Mered
(74) *Attorney, Agent, or Firm* — Seed Intellectual Property Law Group LLP

(57) ABSTRACT

A transmission apparatus comprises an assignment information generator which, in operation, assigns resources on a resource unit (RU) basis to one or more terminal stations (STAs) and generates assignment information that specifies RUs allocated to the one or more STAs; a transmission signal generator which, in operation, generates a transmission signal that includes a legacy preamble, a non-legacy preamble and a data field, wherein the non-legacy preamble comprises a first signal field and a second signal field that carry a set ID and the assignment information, and wherein
(Continued)

HE-SIG-A 122    HE-SIG-B 124

| | | | | | | | |
|---|---|---|---|---|---|---|---|
| NON-OFDMA | COMMON CONTROL INFO | RESOURCE ASSIGNMENT INFO & USER SPECIFIC INFO | CRC/TAIL | | | | |
| OFDMA | COMMON CONTROL INFO | RESOURCE ASSIGNMENT INDICATION & USER SPECIFIC INFO FOR THE 1ST ASSIGNMENT | CRC/TAIL | RESOURCE ASSIGNMENT INDICATION & USER SPECIFIC INFO FOR THE 2ND ASSIGNMENT | ... | RESOURCE ASSIGNMENT INDICATION & USER SPECIFIC INFO FOR THE N-th ASSIGNMENT | CRC/TAIL | the set ID identifies one assignment set comprising the one or more STAs and a plurality of assignment indices, and wherein the assignment information comprises a resource assignment indication for each of a plurality of assignment which are referenced by the plurality of assignment indices; and a transmitter which, in operation, transmits the generated transmission signal.

19 Claims, 26 Drawing Sheets

Related U.S. Application Data continuation of application No. 18/155,637, filed on Jan. 17, 2023, now Pat. No. 11,889,529, which is a continuation of application No. 17/017,300, filed on Sep. 10, 2020, now Pat. No. 11,589,341, which is a continuation of application No. 15/790,875, filed on Oct. 23, 2017, now Pat. No. 10,805,912, which is a continuation of application No. PCT/JP2016/002882, filed on Jun. 15, 2016.

(51) Int. Cl.

| | |
|---|---|
| *H04L 1/00* | (2006.01) |
| *H04L 5/00* | (2006.01) |
| *H04W 40/24* | (2009.01) |
| *H04W 74/00* | (2009.01) |

(52) U.S. Cl.
CPC ............ *H04L 5/001* (2013.01); *H04L 5/0035* (2013.01); *H04L 5/0044* (2013.01); *H04L 5/005* (2013.01); *H04L 5/0051* (2013.01); *H04L 5/0053* (2013.01); *H04L 5/0091* (2013.01); *H04L 5/0094* (2013.01); *H04W 40/24* (2013.01); *H04W 74/004* (2013.01); *H04L 5/0007* (2013.01)

(58) Field of Classification Search
CPC ..... H04L 5/001; H04L 5/0035; H04L 5/0044; H04L 5/005; H04L 5/0051; H04L 5/0053; H04L 5/0091; H04L 5/0094; H04L 5/0007

See application file for complete search history.

(56) References Cited

U.S. PATENT DOCUMENTS

| | | | |
|---|---|---|---|
| 10,469,631 | B2 | 11/2019 | Hedayat |
| 10,693,532 | B2 | 6/2020 | Kwon et al. |
| 2005/0015703 | A1 | 1/2005 | Terry et al. |
| 2010/0111007 | A1 | 5/2010 | Suo et al. |
| 2011/0299468 | A1 | 12/2011 | Van Nee et al. |
| 2012/0020261 | A1 | 1/2012 | Van Zelst et al. |
| 2014/0044088 | A1 | 2/2014 | Nogami et al. |
| 2014/0307612 | A1 | 10/2014 | Vermani et al. |
| 2015/0327217 | A1 | 11/2015 | Aboul-Magd et al. |
| 2015/0365203 | A1 | 12/2015 | Suh et al. |
| 2015/0365923 | A1 | 12/2015 | Vermani et al. |
| 2016/0143005 | A1 | 5/2016 | Ghosh et al. |
| 2016/0143010 | A1 | 5/2016 | Kenney et al. |
| 2016/0255610 | A1 | 9/2016 | Li et al. |
| 2016/0270119 | A1 | 9/2016 | Djukic et al. |
| 2016/0330715 | A1 | 11/2016 | Chen et al. |
| 2016/0366688 | A1 | 12/2016 | Chen et al. |
| 2016/0381664 | A1 | 12/2016 | Ghosh et al. |
| 2017/0033898 | A1 | 2/2017 | Chun et al. |
| 2017/0105143 | A1 | 4/2017 | Seok |
| 2017/0201357 | A1* | 7/2017 | Choi ................... H04L 27/2613 |
| 2017/0250847 | A1 | 8/2017 | Li et al. |
| 2017/0280453 | A1 | 9/2017 | Choi et al. |

FOREIGN PATENT DOCUMENTS

| | | |
|---|---|---|
| RU | 2313912 C2 | 12/2007 |
| WO | WO 2012147601 A1 | 11/2012 |
| WO | WO 2014172198 A1 | 10/2014 |
| WO | WO 2014193547 A1 | 12/2014 |

OTHER PUBLICATIONS

IEEE 802.11-14/1210r1, "HEW PPDU Format for Supporting MIMO-OFDMA", slides 1-16, Sep. 14, 2014.

IEEE 802.11-14/1417r0, "HEW PPDU Transmission Discussion", Slides 1-13, Nov. 2, 2014.

IEEE 802.11-15/0132r5, "Specification Framework for TGax", pp. 1-7, May 14, 2015.

IEEE 802.11-15/0330r5, "OFDMA Numerology and Structure", slides 1-50, May 13, 2015.

IEEE 802.11-15/0344r2, "SIG Field Design Principle for 11ax", slides 1-18, Mar. 9, 2015.

IEEE 802.11-15/0574r0, "SIG Structure for UL PPDU", slides 1-17, May 11, 2015.

IEEE 802.11-15/0586r1, "Frequency Diversity Options in OFDMA", slides 1-12, May 4, 2015.

IEEE 802.11-15/0621r2, "Design Principles for HE Preamble", slides 1-13, May 13, 2015.

IEEE Computer Society, "Part11: Wireless LAN Medium Access Control (MAC) and Physical Layer (PHY) Specification", IEEE Std 802.11 (TM)—2012, Mar. 29, 2012. (2793 pages).

IEEE Computer Society, "Part11: Wireless LAN Medium Access Control (MAC) and Physical Layer (PHY) Specifications Amendment 4: Enhancements for Very High Throughput for Operation in Bands below 6 GHz", IEEE Std 802.11ac(TM)—2013, Dec. 18, 2013.

IEEE P802.11 Wireless LANs, "Proposed 802.11ax Functional Requirements", pp. 1-5, Sep. 18, 2014.

International Search Report, dated Aug. 30, 2016, for PCT application No. PCT/JP2016/002882. (1 page).

\* cited by examiner

FIG. 3
(PRIOR ART)

TYPE I RU
TYPE II RU
TYPE III RU
TYPE IV RU
TYPE V RU

TONE INDEX

-300  -200  -100  0  100  200  300

| NUMBER OF ALLOCATED RUs | TYPE OF 1st ALLOCATED RU | ⋯ | TYPE OF n-th ALLOCATED RU |

| NUMBER OF ALLOCATED RUs | TYPE OF ALLOCATED RUs |

| TYPE OF ALLOCATED RU |

FIG. 10A

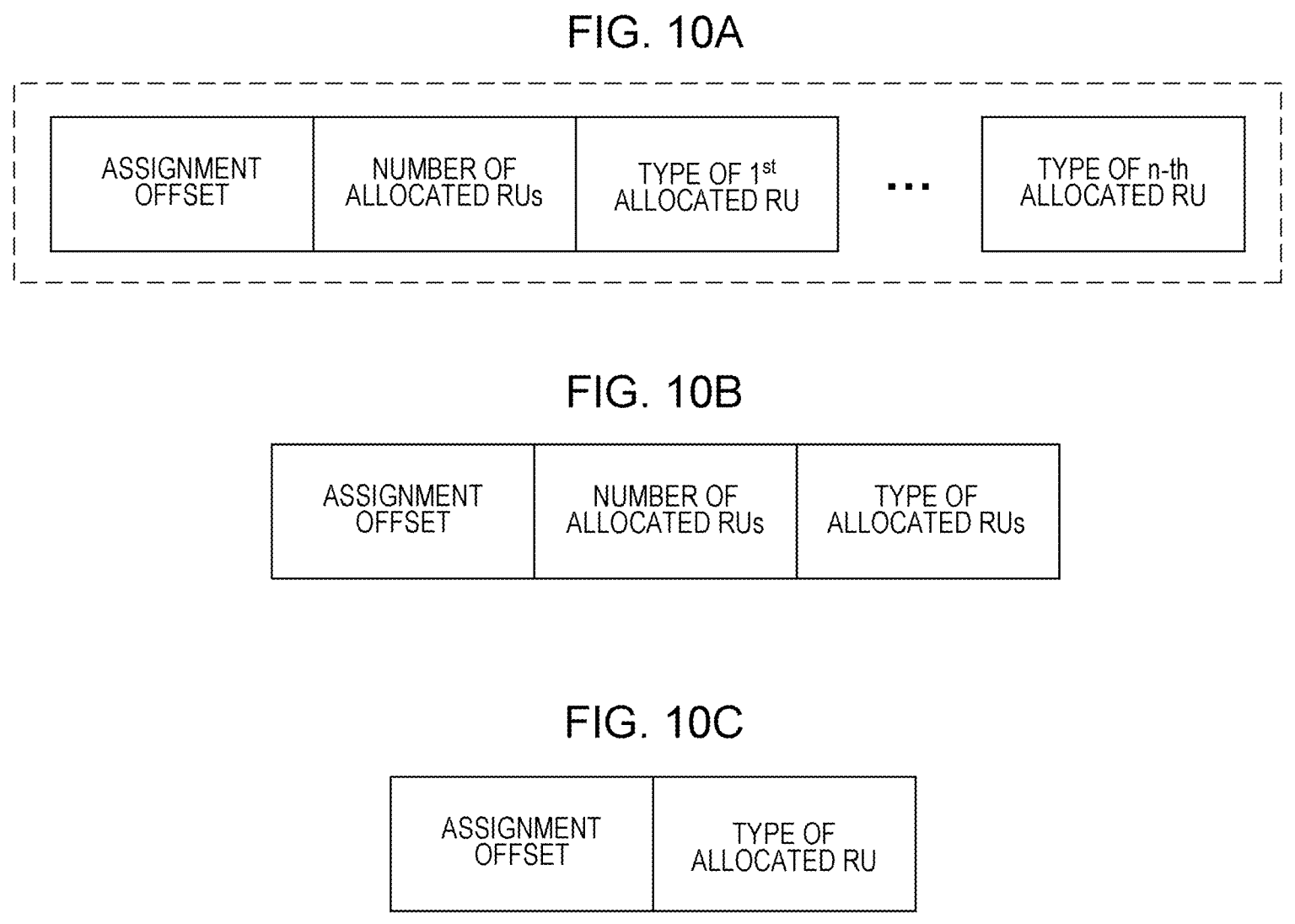

| ASSIGNMENT OFFSET | NUMBER OF ALLOCATED RUs | TYPE OF 1st ALLOCATED RU | ... | TYPE OF n-th ALLOCATED RU |
| --- | --- | --- | --- | --- |

FIG. 10B

| ASSIGNMENT OFFSET | NUMBER OF ALLOCATED RUs | TYPE OF ALLOCATED RUs |
| --- | --- | --- |

FIG. 10C

| ASSIGNMENT OFFSET | TYPE OF ALLOCATED RU |
| --- | --- |

FIG. 12A

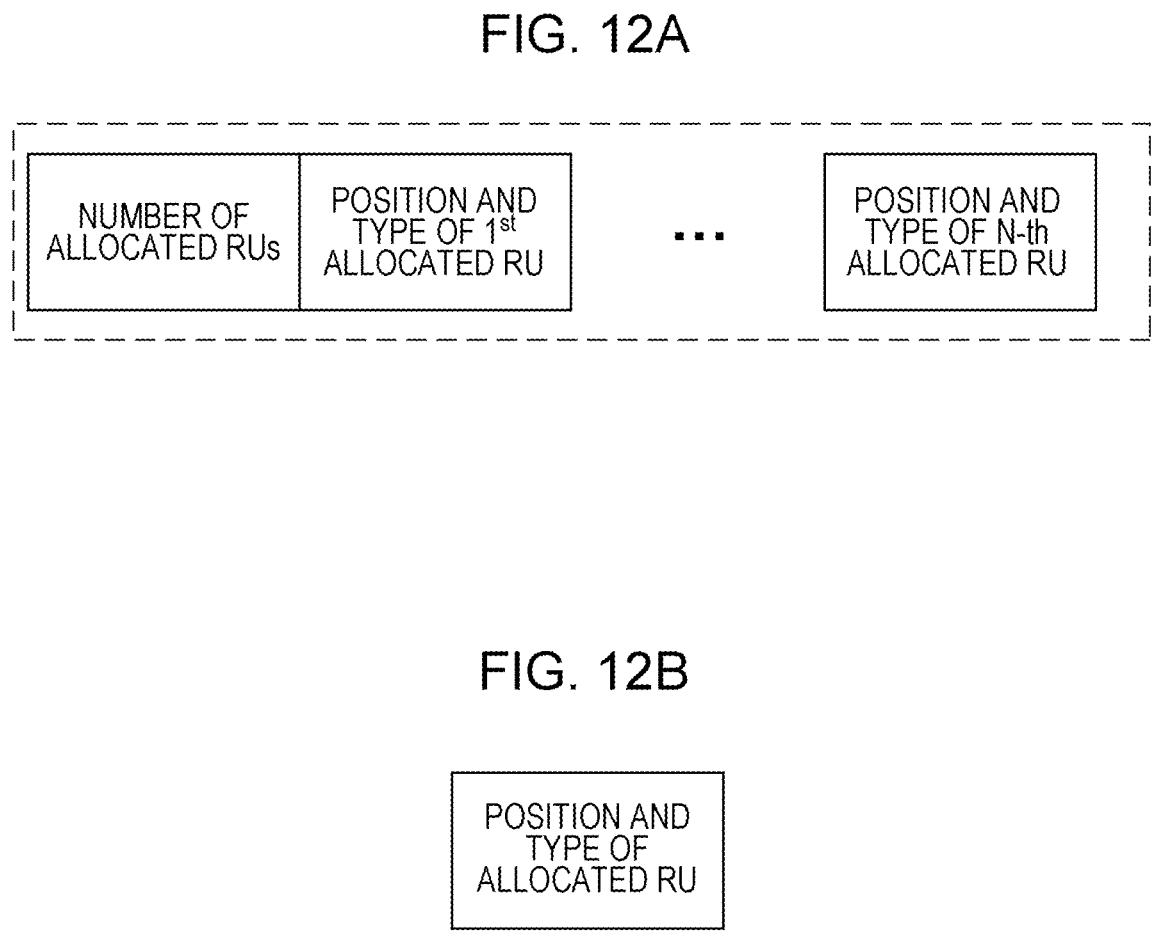

| NUMBER OF ALLOCATED RUs | POSITION AND TYPE OF 1st ALLOCATED RU | ... | POSITION AND TYPE OF N-th ALLOCATED RU |
|---|---|---|---|

FIG. 12B

| POSITION AND TYPE OF ALLOCATED RU |
|---|

FIG. 13

| INDEX | TYPE AND POSITION OF ALLOCATED RU | INDEX | TYPE AND POSITION OF ALLOCATED RU | INDEX | TYPE AND POSITION OF ALLOCATED RU | INDEX | TYPE AND POSITION OF ALLOCATED RU |
|---|---|---|---|---|---|---|---|
| $00_{16}$ | THE 1st TYPE I RU | $10_{16}$ | THE 10th TYPE I RU | $21_{16}$ | THE 19th TYPE I RU | $44_{16}$ | THE 38th TYPE I RU |
| .... | | .... | | .... | | .... | |
| $08_{16}$ | THE 9th TYPE I RU | $18_{16}$ | THE 18th TYPE I RU | $33_{16}$ | THE 37th TYPE I RU | $68_{16}$ | THE 74th TYPE I RU |
| $09_{16}$ | THE 1st TYPE II RU | $19_{16}$ | THE 5th TYPE II RU | $34_{16}$ | THE 9th TYPE II RU | $69_{16}$ | THE 17th TYPE II RU |
| .... | | .... | | .... | | .... | |
| $0C_{16}$ | THE 4th TYPE II RU | $1C_{16}$ | THE 8th TYPE II RU | $3B_{16}$ | THE 16th TYPE II RU | $78_{16}$ | THE 32nd TYPE II RU |
| $0D_{16}$ | THE 1st TYPE III RU | $1D_{16}$ | THE 3rd TYPE III RU | $3C_{16}$ | THE 5th TYPE III RU | $79_{16}$ | THE 9th TYPE III RU |
| $0E_{16}$ | THE 2nd TYPE III RU | $1E_{16}$ | THE 4th TYPE III RU | .... | | .... | |
| $0F_{16}$ | THE 1st TYPE IV RU | $1F_{16}$ | THE 2nd TYPE IV RU | $3F_{16}$ | THE 8th TYPE III RU | $80_{16}$ | THE 16th TYPE III RU |
| | | $20_{16}$ | THE 1st TYPE V RU | $40_{16}$ | THE 3rd TYPE IV RU | $81_{16}$ | THE 5th TYPE IV RU |
| | | | | $41_{16}$ | THE 4th TYPE IV RU | .... | |
| | | | | $42_{16}$ | THE 2nd TYPE V RU | $84_{16}$ | THE 8th TYPE IV RU |
| | | | | $43_{16}$ | THE 1st TYPE VI RU | $85_{16}$ | THE 3rd TYPE V RU |
| | | | | | | $86_{16}$ | THE 4th TYPE V RU |
| | | | | | | $87_{16}$ | THE 2nd TYPE VI RU |
| RUs SUPPORTED BY 20 MHz OFDMA | | ADDITIONAL RUs SUPPORTED BY 40 MHz OFDMA | | ADDITIONAL RUs SUPPORTED BY 80 MHz OFDMA | | ADDITIONAL RUs SUPPORTED BY 160 MHz OR 80+80 MHz OFDMA | |

FIG. 17

PHY
PROCESSOR 1710

1712

MESSAGE
GENERATOR 1708

MESSAGE
PROCESSOR 1706

SCHEDULER 1704

CONTROLLER 1702

MAC LAYER

FIG. 18

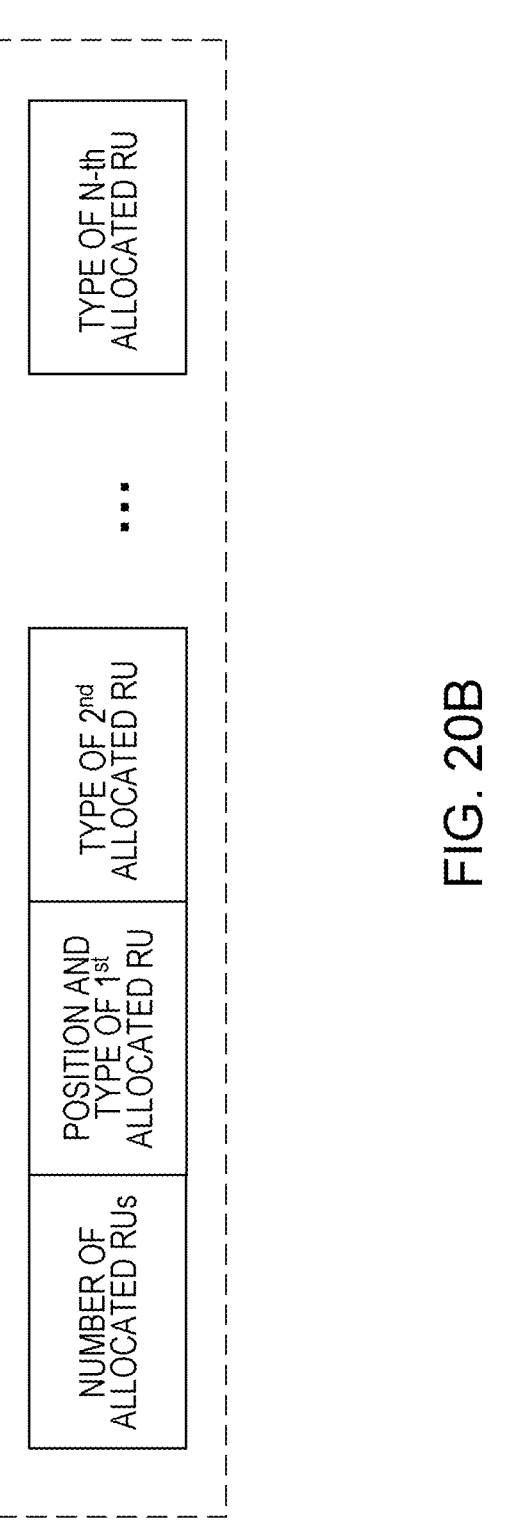
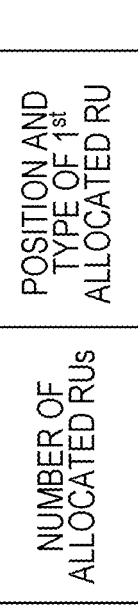
FIG. 20A
FIG. 20B

FIG. 24

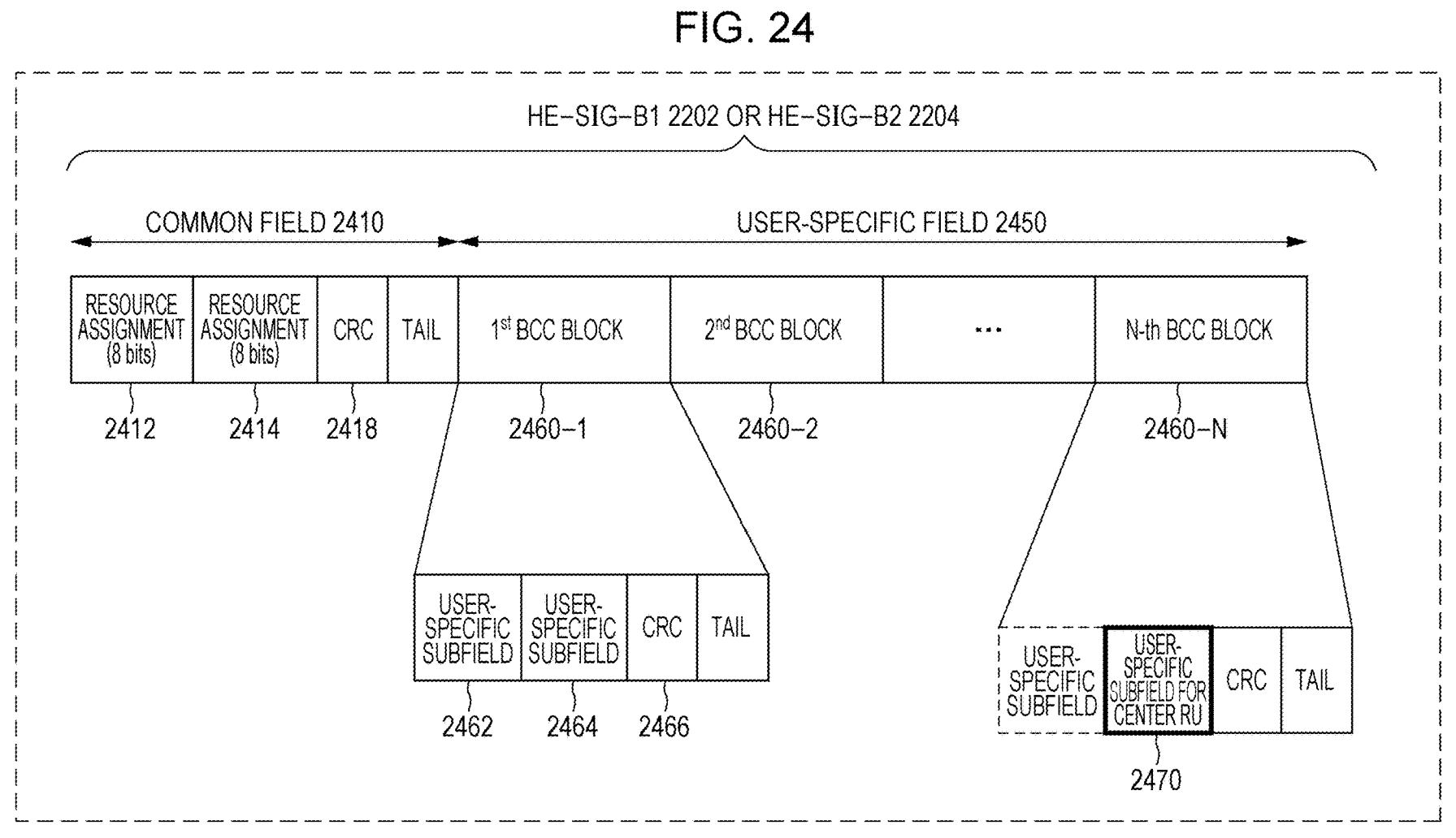

HE-SIG-B1 2202 OR HE-SIG-B2 2204

COMMON FIELD 2410

USER-SPECIFIC FIELD 2450

| RESOURCE ASSIGNMENT (8 bits) | RESOURCE ASSIGNMENT (8 bits) | CRC | TAIL |
|---|---|---|---|
| 2412 | 2414 | 2418 | |

1st BCC BLOCK 2460-1

2nd BCC BLOCK 2460-2

...

N-th BCC BLOCK 2460-N

| USER-SPECIFIC SUBFIELD | USER-SPECIFIC SUBFIELD | CRC | TAIL |
|---|---|---|---|
| 2462 | 2464 | 2466 | |

USER-SPECIFIC SUBFIELD

USER-SPECIFIC SUBFIELD FOR CENTER RU 2470

CRC

TAIL

TRANSMISSION APPARATUS AND TRANSMISSION METHOD OF RESOURCE ASSIGNMENT INFORMATION

BACKGROUND

1. Technical Field

The present disclosure generally pertains to wireless communications and, more particularly, to a method for formatting and transmitting resource assignment information in a wireless communications system.

2. Description of the Related Art

The IEEE (Institute of Electrical and Electronics Engineers) 802.11 Working Group is developing 802.11ax HE (High Efficiency) WLAN (Wireless Local Area Network) air interface in order to achieve a very substantial increase in the real-world throughput achieved by users in high density scenarios. OFDMA (Orthogonal Frequency Division Multiple Access) multiuser transmission has been envisioned as one of the most important features in 802.11ax.

OFDM (Orthogonal Frequency Division Multiplexing) is a multiplexing technique that subdivides a system bandwidth into a plurality of orthogonal frequency subcarriers. In OFDM system, an input data stream is divided into several parallel substreams with a lower data rate (accordingly, increased symbol duration), and the substreams are modulated with respective orthogonal subcarriers and are transmitted. The increased symbol duration improves the robustness of OFDM system with respect to the channel delay spread. Further, introduction of a CP (Cyclic Prefix) is able to completely remove intersymbol interference so far as the CP duration is longer than the channel delay spread. Further, OFDM modulation may be realized by an efficient IFFT (Inverse Fast Fourier Transform) that makes a plurality of subcarriers usable with little complexity. In OFDM system, time and frequency resources are defined by OFDM symbols in a time domain and subcarriers in a frequency domain. OFDMA is a multiple access scheme that performs multiple operations of data streams to and from the plurality of users over the time and frequency resources of the OFDM system.

Studies are underway to perform frequency scheduling for OFDMA multiuser transmission in 802.11ax. According to frequency scheduling, a radio communication access point apparatus (hereinafter simply "access point") adaptively assigns subcarriers to a plurality of radio communication station apparatuses (i.e., terminal apparatus, herein-after simply "stations") based on reception qualities of frequency bands of the stations (also called as "STAs"). This makes it possible to obtain a maximum multiuser diversity effect and perform communication quite efficiently.

Frequency scheduling is generally performed based on a Resource Unit (RU). A RU comprises a plurality of consecutive subcarriers. The RUs are assigned by an access point (AP) to each of a plurality of STAs with which the AP communicates. The resource assignment result of frequency scheduling performed by the AP shall be reported to the STAs as resource assignment information. However, unlike other OFDMA based mobile communication standards such as LTE (Long Term Evolution) and WiMAX (Worldwide Interoperability for Microwave Access), 802.11ax is packet oriented and does not support control channels for transmitting resource assignment information. IEEE Std 802.11ac-2013 is an example of related art.

SUMMARY

As flexibility in frequency scheduling increases, more signaling bits are needed to report the resource assignment information to STAs. This results in an increase of the overhead for reporting resource assignment information. So there is a relationship of trade-off between flexibility in frequency scheduling and overhead for reporting resource assignment information. A challenge is how to achieve flexible frequency scheduling while reducing an increase of the overhead for reporting resource assignment information.

In one general aspect, the techniques disclosed here feature: a transmission apparatus of the present disclosure comprising a signal generator which, in operation, generates a transmission signal that includes a legacy preamble, a non-legacy preamble and a data field, wherein the non-legacy preamble comprises a first signal field and a second signal field, the second signal field including a resource assignment subfield that indicates a plurality of resource unit (RU) assignments in a frequency domain and a plurality of user-specific subfields, each carrying per-user allocation information, and wherein a single RU is allocated to each of the plurality of RU assignments and a start tone index of second one of the plurality of RU assignments is larger than an end tone index of its preceding assignment; and a transmitter which, in operation, transmits the generated transmission signal.

With the transmission apparatus and transmission method of resource assignment information of the present disclosure, it is possible to achieve flexible frequency scheduling while suppressing an increase of the overhead for reporting resource assignment information.

It should be noted that general or specific disclosures may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 shows a diagram illustrating an example OFDMA structure of the data field in case of CBW=40 MHz according to the prior art;

FIG. 10A shows a diagram illustrating a first example of resource assignment indication according to the second embodiment of the present disclosure;

FIG. 10B shows a diagram illustrating a second example of resource assignment indication according to the second embodiment of the present disclosure;

FIG. 10C shows a diagram illustrating a third example of resource assignment indication according to the second embodiment of the present disclosure;

FIG. 12A shows a diagram illustrating a first example of resource assignment indication according to the third embodiment of the present disclosure;

FIG. 12B shows a diagram illustrating a second example of resource assignment indication according to the third embodiment of the present disclosure;

FIG. 13 shows a diagram illustrating a signaling of the RU type and position information according to the third embodiment of the present disclosure;

FIG. 17 shows a block diagram illustrating an example configuration of AP according to the present disclosure;

FIG. 18 shows a block diagram illustrating an example configuration of STA according to the present disclosure;

FIG. 20A shows a diagram illustrating a first example of resource assignment indication according to the fourth embodiment of the present disclosure;

FIG. 20B shows a diagram illustrating a second example of resource assignment indication according to the fourth embodiment of the present disclosure;

FIG. 24 shows a diagram illustrating a first example format of the HE-SIG-B1 or the HE-SIG-B2 in case of CBW=80 MHz;

DETAILED DESCRIPTION

Various embodiments of the present disclosure will now be described in detail with reference to the annexed drawings. In the following description, a detailed description of known functions and configurations has been omitted for clarity and conciseness.

Underlying Knowledge Forming Basis of the Present Disclosure

Figure 1:
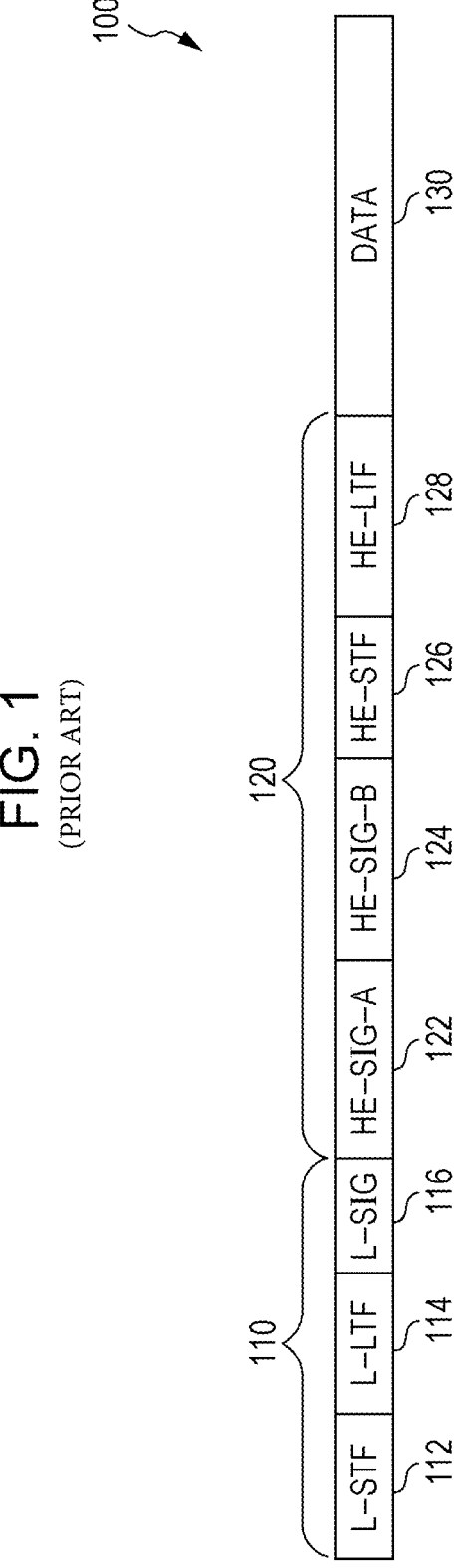
FIG. 1 shows a diagram illustrating an example format of PPDU according to the prior art.

FIG. 1 illustrates an example format of PPDU (Physical layer Protocol Data Unit) 100 according to the prior art (see IEEE802.11-15/0132r5, Specification Framework for TGax, May 2015 and IEEE802.11-15/0621r2, Design Principles for HE Preamble, May 2015). The PPDU 100 comprises a legacy preamble 110, a non-legacy preamble (i.e., High Efficiency (HE) preamble) 120 and a data field 130.

The data field 130 carries the payload for one or more STAs. For a specific STA in terms of single user transmission or a specific group of STAs in terms of multiuser MIMO transmission, the payload is carried on a designated resource in units of Resource Unit (RU) spanning a plurality of OFDM symbols. A RU may have different types depending on the number of constituent subcarriers per RU. OFDM symbols in the data field 130 shall use a DFT period of 12.8 $\mu$s and subcarrier spacing of 78.125 kHz. The number of subcarriers per OFDM symbol depends on a size of channel bandwidth (CBW). For example, in case of CBW=80 MHz, the number of subcarriers per OFDM symbol is 1024. Therefore for a specific type of RU, the maximum number of RUs per OFDM symbol depends on a size of CBW as well.

Figure 2:
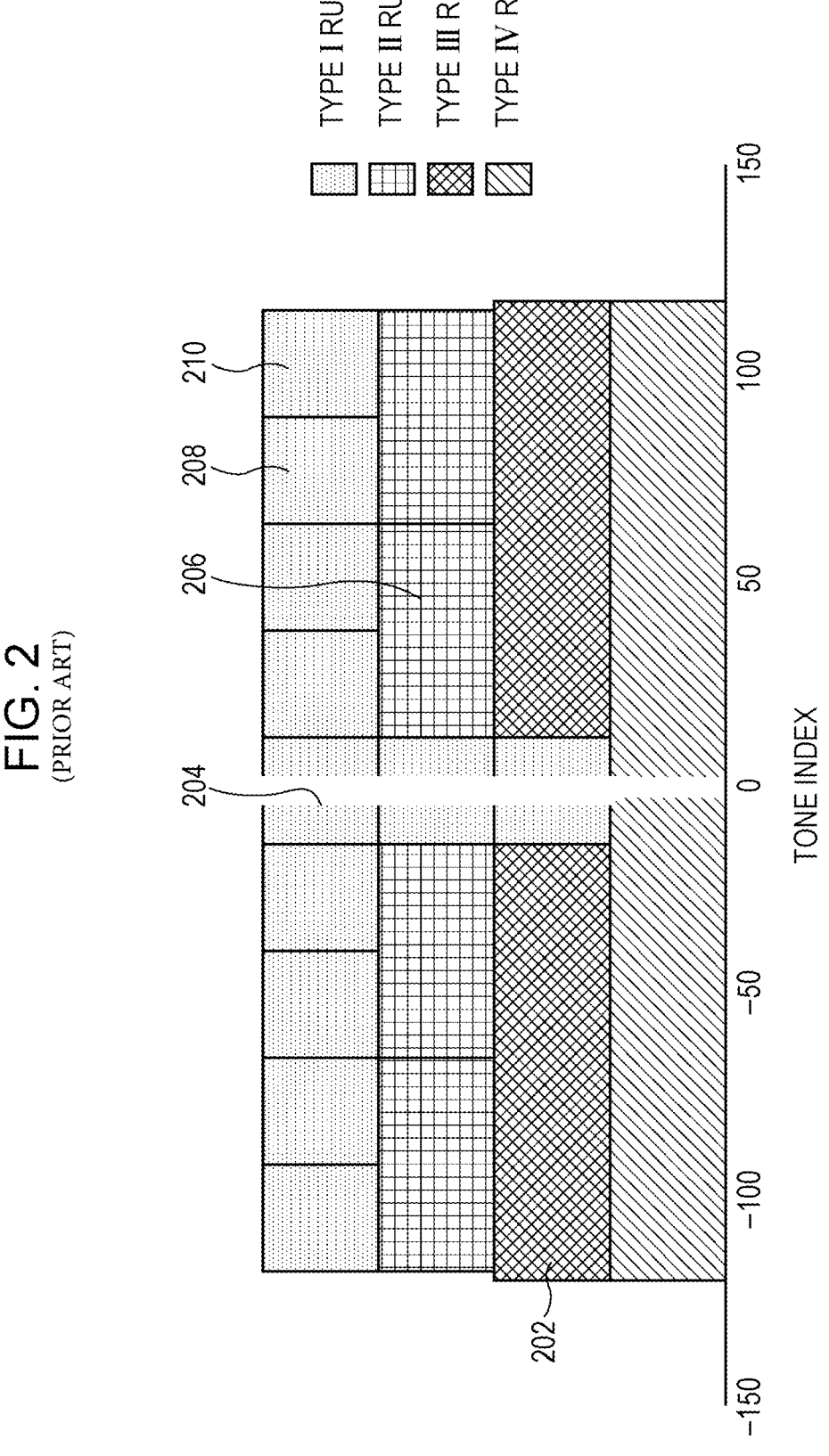
FIG. 2 shows a diagram illustrating an example OFDMA structure of the data field in case of CBW=20 MHz according to the prior art.

FIG. 2 illustrates an example OFDMA structure of the data field 130 in case of CBW=20 MHz according to the prior art (see IEEE802.11-15/0132r5, Specification Framework for TGax, May 2015 and IEEE802.11-15/0330r5, OFDMA Numerology and Structure, May 2015). The 20 MHz OFDMA supports four types of RUs. The Type I RU comprises 26 consecutive tones and has a bandwidth of about 2 MHz. The Type II RU comprises 52 consecutive tones and has a bandwidth of about 4.1 MHz. The Type III RU comprises 106 consecutive tones and has a bandwidth of about 8.3 MHz. The Type IV RU comprises 242 consecutive tones and has a bandwidth of about 18.9 MHz. The maximum number of Type I RUs, Type II RUs, Type III RUs and Type IV RUs which the 20 MHz OFDMA is able to support is nine, four, two and one, respectively. A mix of different types of RUs can be accommodated in the 20 MHz OFDMA. For example, the 20 MHz OFDMA may be divided into one Type III RU 202, three Type I RUs 204, 208 and 210 as well as one Type II RU 206.

Figure 3:
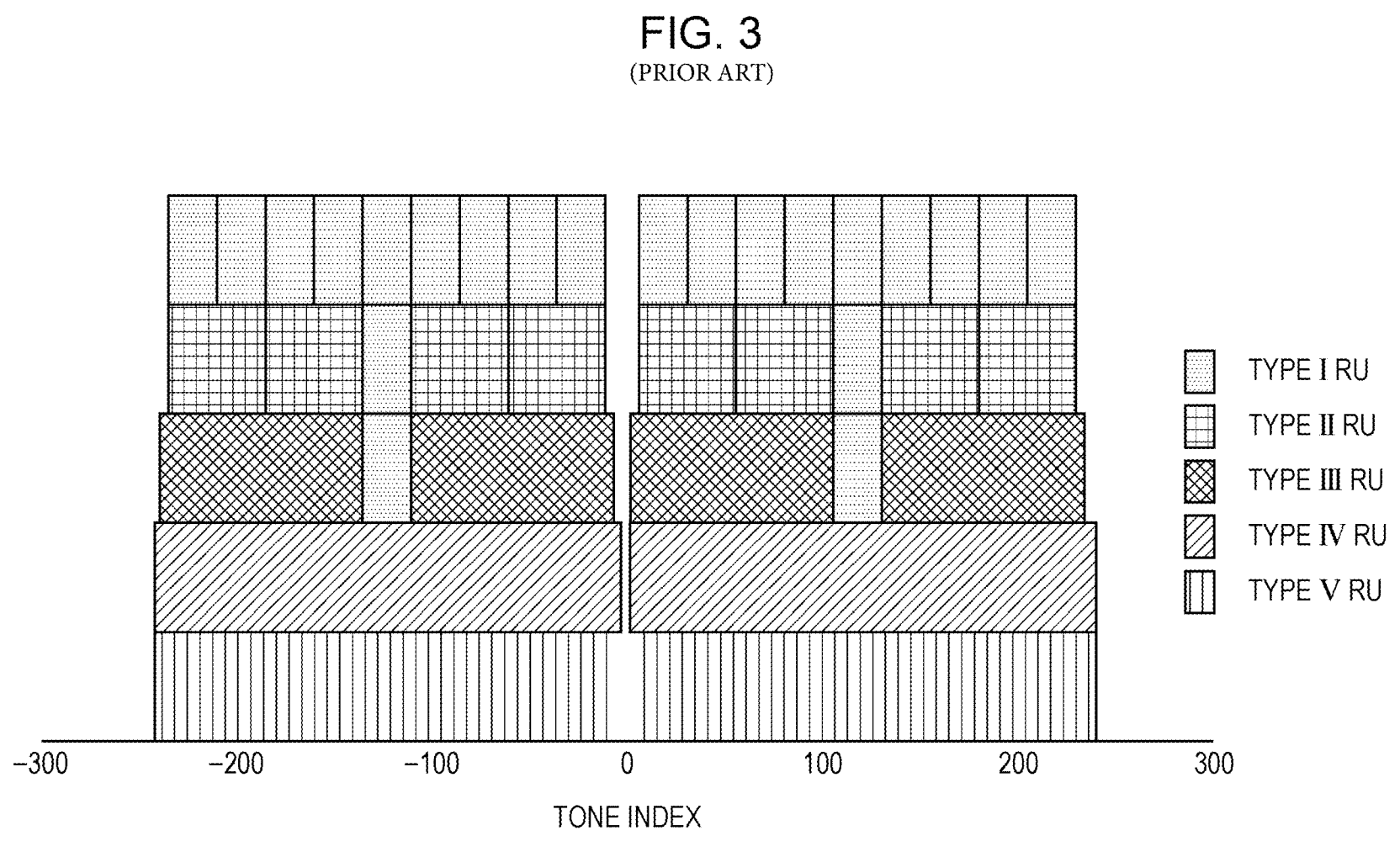

FIG. 3 illustrates an example OFDMA structure of the data field 130 in case of CBW=40 MHz according to the prior art (see IEEE802.11-15/0132r5, Specification Framework for TGax, May 2015 and IEEE802.11-15/0330r5, OFDMA Numerology and Structure, May 2015). In addition to Type I RU, Type II RU, Type III RU and Type IV RU, the 40 MHz OFDMA also supports Type V RU, which comprises 484 consecutive tones and has a bandwidth of about 37.8 MHz. The maximum number of Type I RUs, Type II RUs, Type III RUs, Type IV RUs and Type V RUs which the 40 MHz OFDMA is able to support is eighteen, eight, four, two and one, respectively. Similar to the 20 MHz OFDMA, a mix of different types of RUs can also be accommodated in the 40 MHz OFDMA.

Figure 4:
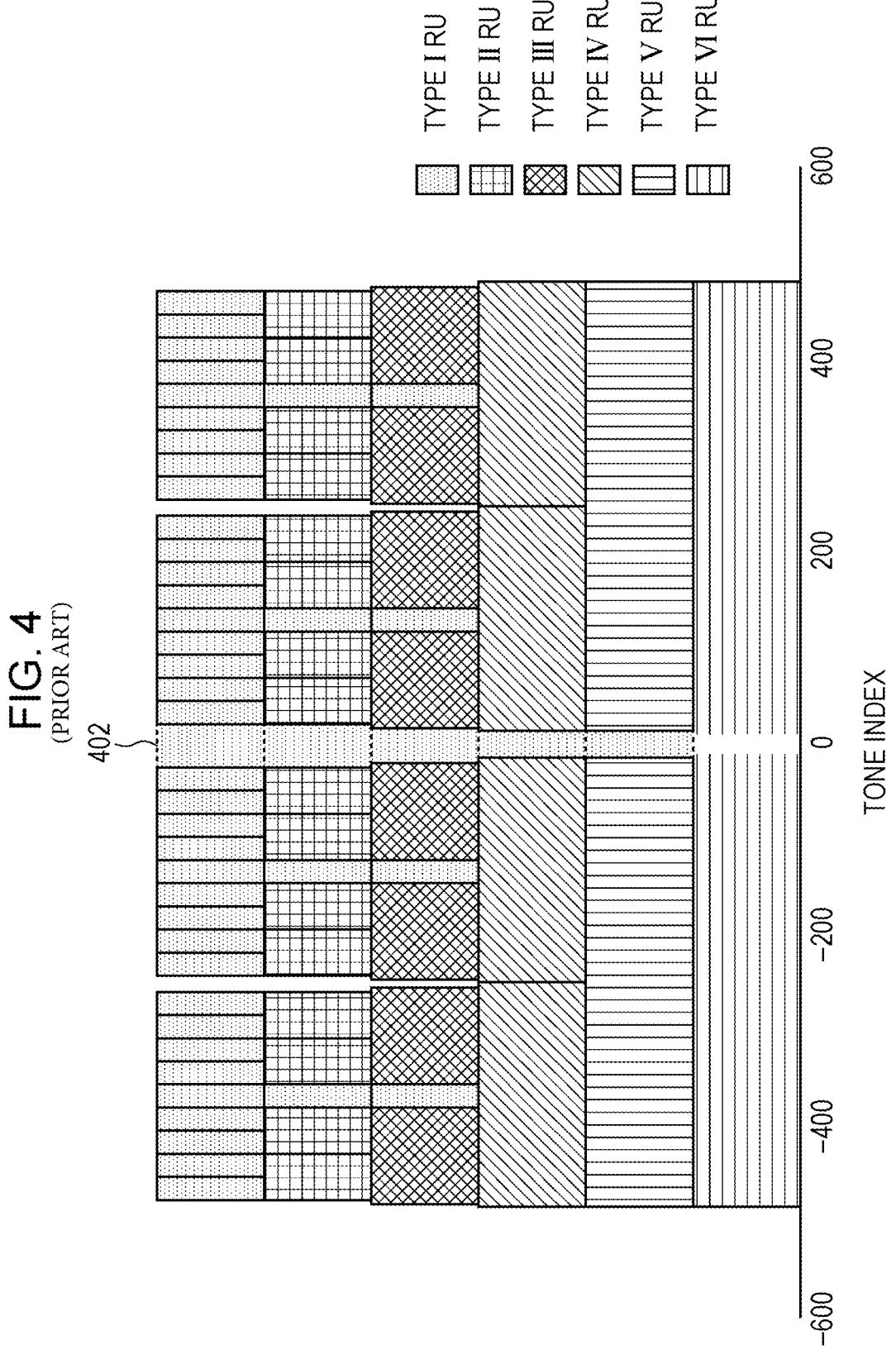
FIG. 4 shows a diagram illustrating an example OFDMA structure of the data field in case of CBW=80 MHz according to the prior art.

FIG. 4 illustrates an example OFDMA structure of the data field 130 in case of CBW=80 MHz according to the prior art (see IEEE802.11-15/0132r5, Specification Framework for TGax, May 2015 and IEEE802.11-15/0330r5, OFDMA Numerology and Structure, May 2015). In addition to Type I RU, Type II RU, Type III RU, Type IV RU and Type V RU, the 80 MHz OFDMA also supports Type VI RU, which comprises 996 consecutive tones and has a bandwidth of about 77.8 MHz. The maximum number of Type I RUs, Type II RUs, Type III RUs, Type IV RUs, Type V RUs and Type VI RUs which the 80 MHz OFDMA is able to support is thirty-seven, sixteen, eight, four, two and one, respectively. Similar to the 20 MHz or 40 MHz OFDMA, a mix of different types of RUs can also be accommodated in the 80 MHz OFDMA.

Similar to the 80 MHz OFDMA, the 80+80 MHz OFDMA or 160 MHz OFDMA also supports six types of RU, i.e., Type I RU, Type II RU, Type III RU, Type IV RU, Type V RU and Type VI RU. The maximum number of Type I RUs, Type II RUs, Type III RUs, Type IV RUs, Type V RUs and Type VI RUs which the 80+80 MHz OFDMA or 160 MHz OFDMA is able to support is seventy-four, thirty-two, sixteen, eight, four and two, respectively. Similar to the 20 MHz, 40 MHz or 80 MHz OFDMA, a mix of different types of RUs can also be accommodated in the 80+80 MHz OFDMA or 160 MHz OFDMA.

Note that use of a Type IV RU in context of 20 MHz OFDMA implies a non-OFDMA configuration, which refers to a case where OFDMA is not used in the data field 130 of FIG. 1. That is, the entire bandwidth of operation is scheduled for single user transmission or multiuser MIMO transmission. Similarly, use of a Type V RU in context of 40 MHz OFDMA or a Type VI RU in context of 80 MHz OFDMA implies a non-OFDMA configuration. In particular, use of two Type VI RUs in context of 160 MHz or 80+80 MHz OFDMA implies a non-OFDMA configuration.

Both continuous resource allocation and non-continuous resource allocation are possible in OFDMA frequency scheduling.

Figure 5:
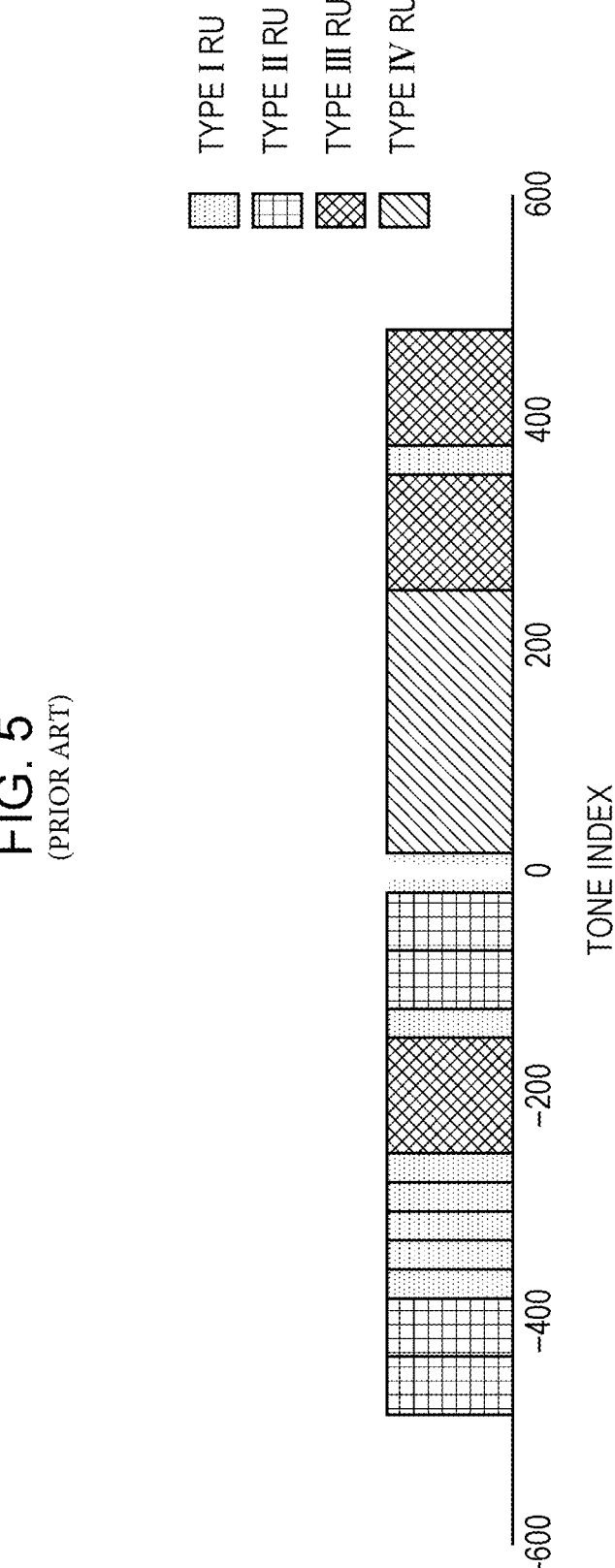
FIG. 5 shows a diagram illustrating an example of continuous resource allocation in the data field according to the prior art.

FIG. 5 illustrates an example of continuous resource allocation in the data field 130 according to the prior art (see IEEE802.11-15/0330r5, OFDMA Numerology and Structure, May 2015). As shown in FIG. 5, a single RU is allocated to a specific STA in terms of single user transmission or a specific group of STAs in terms of multiuser MIMO transmission in one assignment.

Figure 6:
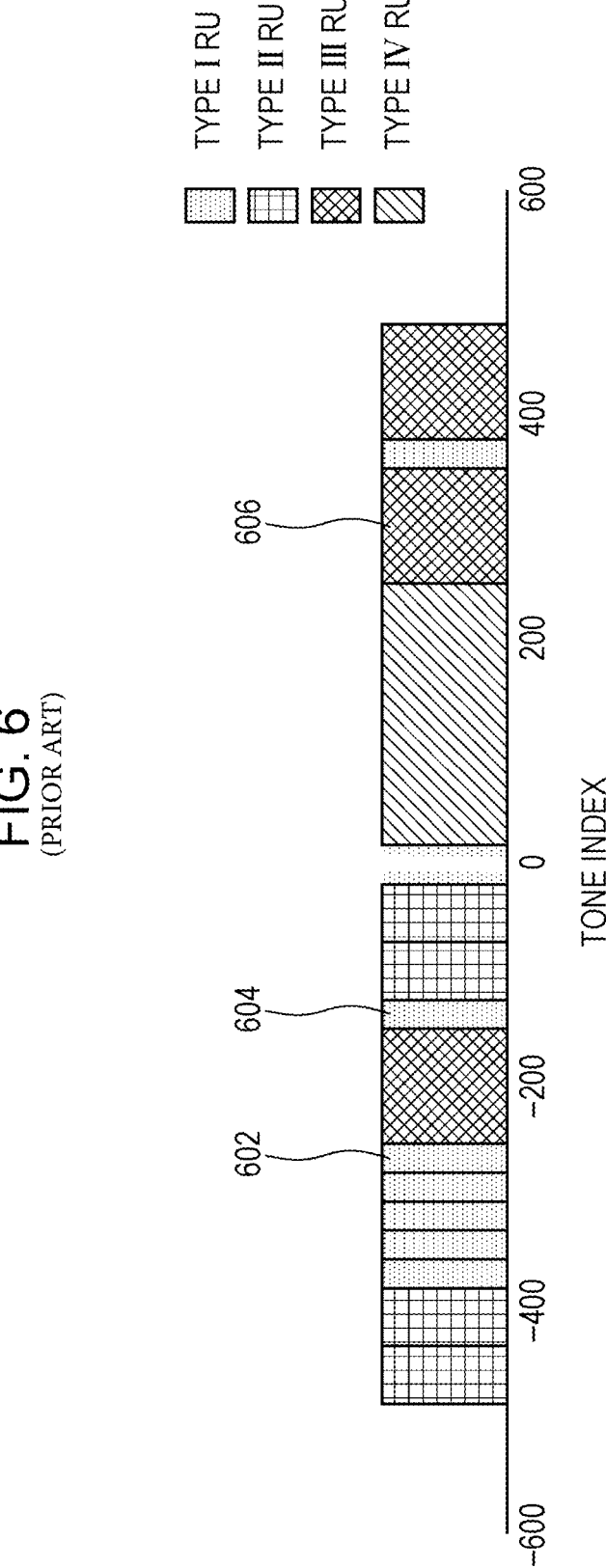
FIG. 6 shows a diagram illustrating an example of non-continuous resource allocation in the data field according to the prior art.

FIG. 6 illustrates an example of non-continuous resource allocation in the data field 130 according to the prior art (see IEEE802.11-15/0586r1, Frequency Diversity Options in OFDMA, May 2015). In non-continuous resource allocation, more than one RUs which may be not continuous in the frequency domain can be allocated in one assignment for the purpose of achieving frequency diversity effect. For example, three non-consecutive RUs 602, 604, and 606 are allocated in one assignment.

With reference to FIG. 1, the legacy preamble 110 comprises a L-STF (Legacy Short Training Field) 112, a L-LTF (Legacy Long Training Field) 114 and a L-SIG (Legacy SIGnal field) 116 in order to keep backward compatibility with legacy standard 802.11a/g/n/ac. The L-STF 112 is used for start-of-packet detection, AGC (Automatic Gain Control) setting, initial frequency offset estimation and initial time synchronization. The L-LTF 114 is used for further fine frequency offset estimation and time synchronization. The L-LTF 114 is also used to generate channel estimates for receiving and equalizing the L-SIG 116, HE-SIG-A (High Efficiency SIGnal A field) 122 and HE-SIG-B (High Efficiency SIGnal B field) 124.

The HE preamble 120 comprises a first signal field (i.e., HE-SIG-A) 122, a second signal field (i.e., HE-SIG-B) 124, a HE-STF 126 and a HE-LTF 128. The HE-STF 126 is used to retrain AGC. The HE-LTF 128 comprises a plurality of HE-LTF symbols and is used to generate MIMO (Multiple Input Multiple Output) channel estimates for receiving and equalizing the data field 130. If the PPDU 100 is a DL OFDMA PPDU, both the HE-SIG-A 122 and the HE-SIG-B 124 contain resource assignment information and user specific information which are used for each scheduled STA to decode its payload in the data field 130 at designated resource (see IEEE802.11-15/0621r2, Design Principles for HE Preamble, May 2015). If the PPDU 100 is a UL OFDMA PPDU, the HE-SIG-A 122 and HE-SIG-B 124 may contain neither resource assignment information nor user specific information since such information is preset by an AP and sent to scheduled STAs via a trigger frame which is carried in the data field of a previously transmitted DL PPDU (see IEEE802.11-15/0574r0, SIG Structure for UL PPDU, May 2015). Note that both HE-SIG-A 122 and HE-SIG-B 124 shall use a DFT period of 3.2 µs and subcarrier spacing of 312.5 kHz in 802.11ax.

Next, various embodiments for resource assignment in frequency scheduling will be explained in further details.

First Embodiment

Figure 7:
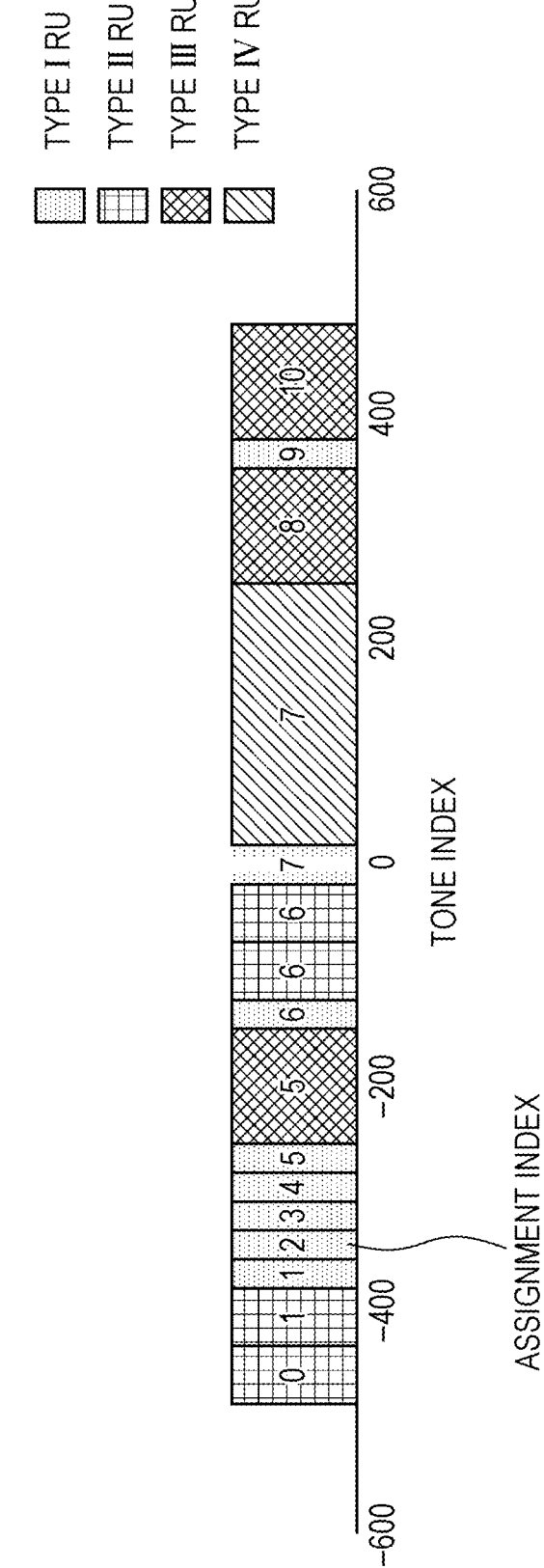
FIG. 7 shows a diagram illustrating an example of resource assignment according to a first embodiment of the present disclosure.

FIG. 7 illustrates an example of resource assignment according to a first embodiment of the present disclosure. The first embodiment is applicable to continuous resource allocation where one or more RUs that are consecutive in the frequency domain are allocated in one assignment. In this example, there are eleven assignments in the 80 MHz OFDMA. Each assignment, which is referenced by an assignment index, is addressed to either a specific STA in terms of single user transmission or a specific group of STAs in terms of multiuser MIMO transmission.

According to the first embodiment, the first assignment has a predetermined start position (e.g., the start tone index of a first RU (e.g., 202 as shown in FIG. 2) which is known according to the size of CBW and the type of the first RU). And a start tone index of a subsequent assignment is next to the end tone index of its preceding assignment (i.e., there is no gap between consecutive assignments). The total number of assignments may be negotiated in advance between an Access Point (AP) and one or more station apparatus (STAs) or signaled to each STA in the HE-SIG-A field of DL PPDU or the trigger frame explicitly. However, assume that all available RUs are allocated, a STA can determine that an assignment is the last assignment if a last RU (e.g., 210 as shown in FIG. 2) is allocated in this assignment. Consequently, signaling of the total number of assignments can be omitted According to the first embodiment, the start position of the first assignment is predetermined and the start position of a subsequent assignment can be determined from the end position of its preceding assignment. Therefore, it is enough to report the allocation bandwidth for each assignment. As a result, the overhead due to reporting resource assignment information for each assignment can be minimized.

According to the first embodiment, the resource assignment information includes a plurality of resource assignment indications, each of which corresponds to a particular assignment.

Figures 8A, 8B, 8C:
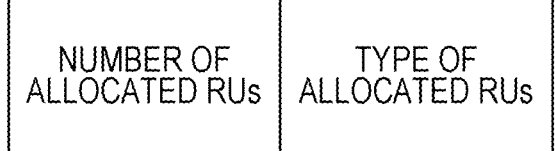
FIG. 8A shows a diagram illustrating a first example of resource assignment indication according to the first embodiment of the present disclosure.
FIG. 8B shows a diagram illustrating a second example of resource assignment indication according to the first embodiment of the present disclosure.
FIG. 8C shows a diagram illustrating a third example of resource assignment indication according to the first embodiment of the present disclosure.

FIG. 8A illustrates a first example of resource assignment indication for one assignment according to the first embodiment of the present disclosure. The resource assignment indication for one assignment contains the number of allocated RUs and the type of each of allocated RUs, from which the allocation bandwidth for the assignment can be derived.

FIG. 8B illustrates a second example of resource assignment indication for one assignment according to the first embodiment of the present disclosure. In this example, only the same type of RUs can be allocated in one assignment. The resource assignment indication for the assignment contains the number of allocated RUs and the type of allocated RUs, from which the allocation bandwidth for the assignment can be derived.

FIG. 8C illustrates a third example of resource assignment indication for one assignment according to the first embodiment of the present disclosure. In this example, only a single RU can be allocated in one assignment. The resource assignment indication for the assignment contains the type of allocated RU only, from which the allocation bandwidth for the assignment can be derived.

In the above mentioned examples of the first embodiment, the number of allocated RUs and the RU type are indicated separately by using bit signalings.

According to the first embodiment, a two-bit signaling shown in Table 1 can be used to indicate the number of allocated RUs. According to Table 1, one RU to four RUs can be allocated in one assignment.

TABLE 1

| Signaling bits | Number of allocated RUs |
|---|---|
| 00 | 1 |
| 01 | 2 |
| 10 | 3 |
| 11 | 4 |

Additionally, a three-bit signaling shown in Table 2 can be used to indicate the RU type as follows:

TABLE 2

| Signaling bits | RU Type |
|---|---|
| 000 | Type I RU |
| 001 | Type II RU |
| 010 | Type III RU |
| 011 | Type IV RU |
| 100 | Type V RU |
| 101 | Type VI RU |
| 110, 111 | Reserved |

For example, the type of the RU (Type II RU) allocated in the first assignment as shown in FIG. 7 can be indicated by "001".

According to the first embodiment, in case of 20 MHz non-OFDMA transmission, the number of allocated RUs shall be set to one and the type of allocated RUs shall be set to Type IV. In case of 40 MHz non-OFDMA transmission, the number of allocated RUs shall be set to one and the type of allocated RUs shall be set to Type V. In case of 80 MHz non-OFDMA transmission, the number of allocated RUs shall be set to one and the type of allocated RUs shall be set to Type VI. In case of 80+80 MHz or 160 MHz non-OFDMA transmission, the number of allocated RUs shall be set to two and the type of each of allocated RUs shall be set to Type VI. In this way, STA shall be able to determine whether an incoming DL PPDU 100 is an OFDMA PPDU or a non-OFDMA PPDU according to the resource assignment information without any dedicated signaling for such purpose.

Second Embodiment

Figure 9:
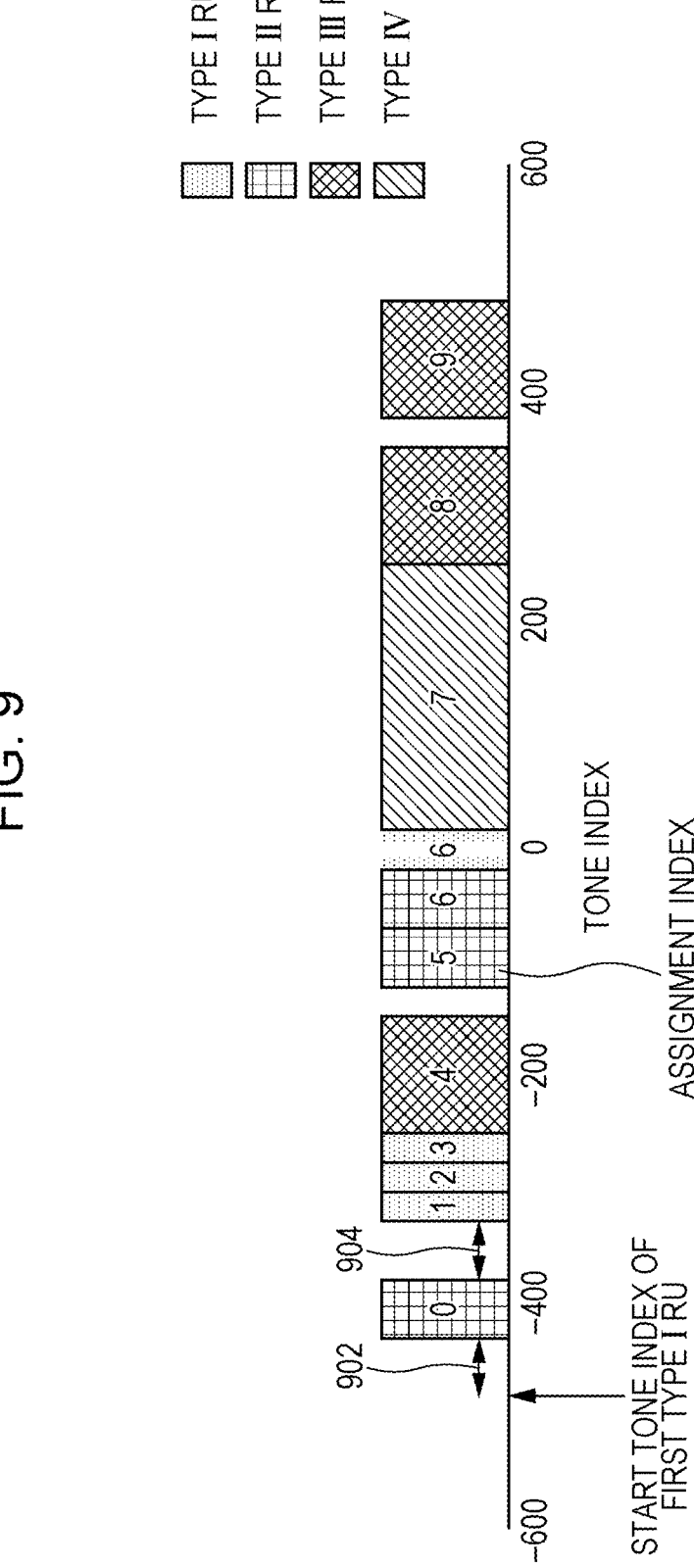
FIG. 9 shows a diagram illustrating an example of resource assignment according to a second embodiment of the present disclosure.

FIG. 9 illustrates an example of resource assignment according to a second embodiment of the present disclosure. The second embodiment is also applicable to continuous resource allocation where one or more RUs that are consecutive in the frequency domain can be allocated in one assignment. In this example, there are ten assignments in the 80 MHz OFDMA. Each assignment is addressed to either a specific STA in terms of single user transmission or a specific group of STAs in terms of multiuser MIMO transmission.

According to the second embodiment, a start position of the first assignment may be variable and a gap may exist between consecutive assignments. In this embodiment, the start tone index of an assignment is always larger than the end tone index of its preceding assignment. The total number of assignments may be negotiated in advance between an AP and one or more STAs or signaled to each STA in the HE-SIG-A field of DL PPDU or the trigger frame explicitly.

According to the second embodiment, the start position of the first assignment is variable and the start position of a subsequent assignment cannot be derived only from the end position of its preceding assignment. Therefore, in addition to allocation bandwidth, it is necessary to report start position for each assignment.

According to the second embodiment, the resource assignment information includes a plurality of resource assignment indications, each of which corresponds to a particular assignment.

FIG. 10A illustrates a first example of resource assignment indication for one assignment according to the second embodiment of the present disclosure. The resource assignment indication for one assignment contains the assignment offset, the number of allocated RUs and the type of each of allocated RUs. As illustrated in FIG. 9, for the first assignment, the assignment offset 902 is relative to the start tone index of the first Type I RU. For each of the remaining assignments, the assignment offset (e.g., 904) is relative to the end tone index of its preceding assignment. The start position for a subsequent assignment can be determined according to the assignment offset and the end tone index of its preceding assignment. Further, the allocation bandwidth for the assignment can be determined according to the number of allocated RUs and the type of each of allocated RUs.

FIG. 10B illustrates a second example of resource assignment indication for one assignment according to the second embodiment of the present disclosure. In this example, only the same type of RUs can be allocated in one assignment. The resource assignment indication for the assignment contains the assignment offset, the number of allocated RUs and the type of allocated RUs. The start position for the assignment can be determined according to the assignment offset and the end tone index of its preceding assignment. Further, the allocation bandwidth for the assignment can be determined according to the number of allocated RUs and the type of allocated RUs.

FIG. 10C illustrates a third example of resource assignment indication for one assignment according to the second embodiment of the present disclosure. In this example, only a single RU can be allocated in one assignment. The resource assignment indication for the assignment contains the assignment offset and the type of allocated RU. The start position for the assignment can be determined according to the assignment offset and the end tone index of its preceding assignment. Further, the allocation bandwidth for the assignment can be determined according to the type of allocated RU.

If reception quality of a RU is very poor for all scheduled STAs, the AP may not allocate the RU to them. This RU with poor reception quality is not used for resource assignment and becomes a gap between two assignments in this embodiment. The number of unused RUs that form a gap can be one or plural. As a result, the second embodiment provides more flexibility in frequency scheduling than the first embodiment. The overhead of reporting resource assignment information will slightly increase compared to the first embodiment. However, such overhead increase is not so significant.

In the above mentioned examples of the second embodiment, the assignment offset, the number of allocated RUs and the RU type are indicated separately by using bit signalings.

According to the second embodiment, if the assignment offset is not larger than three Type I RUs, a two-bit signaling shown in Table 3 can be used to indicate the assignment offset in units of the smallest RU (i.e., Type I RU).

TABLE 3

| Signaling bits | Assignment offset |
|---|---|
| 00 | no offset |
| 01 | an offset of one Type I RU |
| 10 | an offset of two Type I RUs |
| 11 | an offset of three Type I RUs |

For example, for the first assignment as shown in FIG. 9, the assignment offset 902 (e.g., an offset of two Type I RUs) can be indicated by "10".

Two-bit signaling shown in Table 1 can be used to indicate the number of allocated RUs. An alternative two-bit signaling is shown in Table 4. According to Table 4, zero RU to three RUs can be allocated in an assignment. When no RU is allocated in an assignment, the assignment is called a "dummy assignment" with zero RU allocation.

TABLE 4

| Signaling bits | Number of allocated RUs |
|---|---|
| 00 | 0 |
| 01 | 1 |
| 10 | 2 |
| 11 | 3 |

Two-bit signaling shown in Table 4 makes it possible to indicate an offset that is larger than three Type I RUs. For example, if there is an offset of five Type I RUs between a first assignment and a second assignment, this offset can be indicated by inserting a "dummy assignment" with zero RU allocation. More specifically, the "dummy assignment"

located between the first assignment and the second assignment has an offset of three RUs and the second assignment has an offset of two RUs. Then, total offset will be five Type I RUs in this case. In addition, two-bit signaling shown in Table 4 can also make it possible to omit an explicit signaling of the total number of assignments. For example, if no last RU(s) (e.g., 210 as shown in FIG. 2) is allocated to any STA, a "dummy assignment" with zero RU allocation, which has some offset can be used to indicate such unused resource (RU). In this case, the STA is able to determine that the dummy assignment is the last assignment.

According to the second embodiment, in case of 20 MHz non-OFDMA transmission, the number of allocated RUs shall be set to one and the type of allocated RU shall be set to Type IV. In case of 40 MHz non-OFDMA transmission, the number of allocated RUs shall be set to one and the type of allocated RU shall be set to Type V. In case of 80 MHz non-OFDMA transmission, the number of allocated RUs shall be set to one and the type of allocated RU shall be set to Type VI. In case of 80+80 MHz or 160 MHz non-OFDMA transmission, the number of allocated RUs shall be set to two and the type of each of allocated RUs shall be set to Type VI. In this way, STA shall be able to determine whether incoming DL PPDU 100 is an OFDMA PPDU or a non-OFDMA PPDU according to the resource assignment information without any dedicated signaling for such purpose.

Third Embodiment

Figure 11:
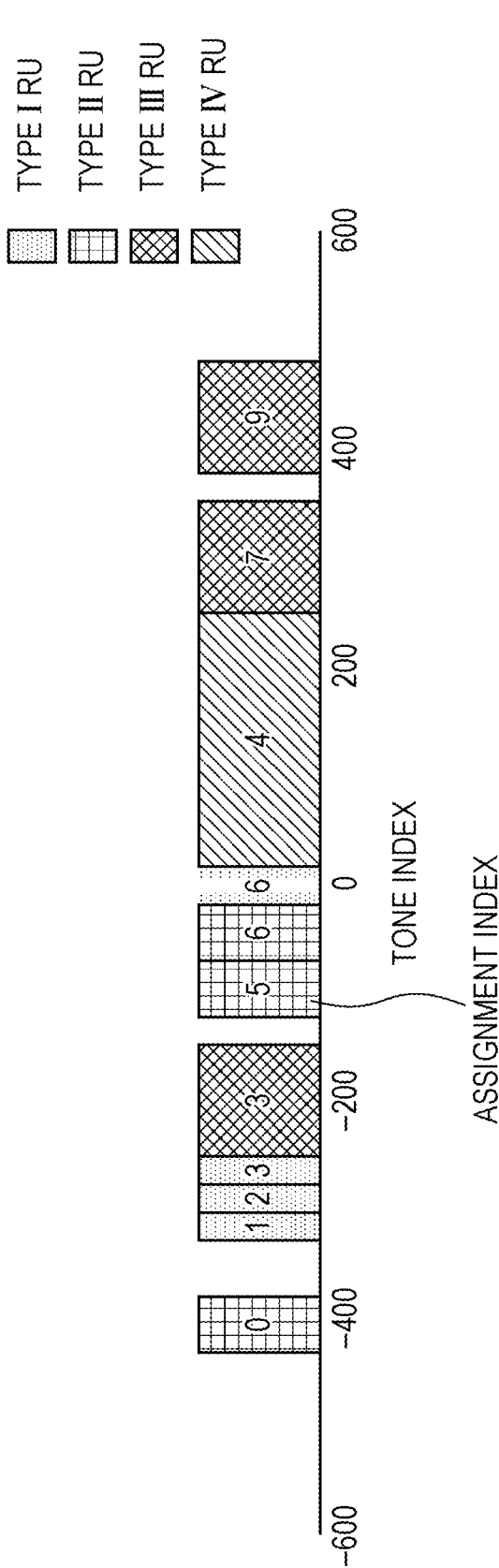
FIG. 11 shows a diagram illustrating an example of resource assignment according to a third embodiment of the present disclosure.

FIG. 11 illustrates an example of resource assignment according to a third embodiment of the present disclosure. The third embodiment is applicable to both continuous resource allocation and non-continuous resource allocation where one or more RUs which may not be consecutive in the frequency domain can be allocated in an assignment. The third embodiment enables even more flexibility in frequency scheduling than the first embodiment and the second embodiment. In this example, there are ten assignments in the 80 MHz OFDMA. Each assignment is addressed to either a specific STA in terms of single user transmission or a specific group of STAs in terms of multiuser MIMO transmission.

According to the third embodiment, the total number of assignments may be negotiated in advance between an AP and one or more STAs, or signaled to each STA in the HE-SIG-A field of DL PPDU or the trigger frame explicitly.

According to the third embodiment, the resource assignment information includes a plurality of resource assignment indications, each of which corresponds to a particular assignment.

FIG. 12A illustrates a first example of resource assignment indication for one assignment according to the third embodiment of the present disclosure. For each assignment, the resource assignment indication contains the number of allocated RUs and the type and position information of each of allocated RUs.

FIG. 12B illustrates a second example of resource assignment indication for one assignment according to the third embodiment of the present disclosure. In this example, only a single RU can be allocated in one assignment. For the assignment, the resource assignment indication contains the type and position information of allocated RU.

According to the third embodiment, the type and position of an allocated RU are jointly signaled in a single signaling field. That is, a single signaling field can be used to indicate both position and type of each of allocated RUs. FIG. 13 illustrates a signaling of the RU type and position information according to the third embodiment of the present disclosure. Encoding of the RU type and position information is performed for RUs which 20 MHz OFDMA can support, followed by encoding for additional RUs which 40 MHz OFDMA can support, encoding for additional RUs which 80 MHz OFDMA can support, and encoding for additional RUs which 160 MHz and 80+80 MHz OFDMA can support in this order.

In the HE preamble of DL PPDU, assignment information regarding RUs of 20 MHz OFDMA is allocated first, followed by assignment information regarding additional RUs of 40 MHz OFDMA, assignment information regarding additional RUs of 80 MHz OFDMA, and assignment information regarding additional RUs of 160 MHz OFDMA in this order. This provides a technical advantage that a receiver of the resource assignment information (i.e., STA) that only supports CBW=20 MHz has to decode only a first part (i.e., assignment information regarding RUs of 20 MHz OFDMA) of the resource assignment information, and it can disregard the remaining part of the resource assignment information. Similarly, a STA that supports CBW=40 MHz has to decode only a first and second parts (i.e., assignment information regarding RUs of 20 MHz OFDMA and 40 MHz OFDMA) of the resource assignment information. Further, a STA that supports CBW=80 MHz has to decode a first, second and third parts (i.e., assignment information regarding RUs of 20 MHz OFDMA, 40 MHz OFDMA and 80 MHz OFDMA) of the resource assignment information. Lastly, a STA that supports CBW=160 MHz has to decode the resource assignment information as a whole. In this way, decoding workload at a STA supporting a smaller channel bandwidth (CBW) can be significantly lowered.

According to the signaling of the RU type and position information illustrated in FIG. 13, in one embodiment, an eight-bit signaling is used to indicate the type and position of an allocated RU. So, the overhead of reporting resource assignment information further increases compared to the second embodiment. Alternatively, signaling whose length is variable depending on CBW may be used. In more details, four-bit signaling, six-bit signaling, seven-bit signaling and eight-bit signaling can be used when CBW=20 MHz, CBW=40 MHz, CBW=80 MHz and CBW=80+80 MHz or 160 MHz, respectively. As a result, an increase of the overhead of reporting resource assignment information due to much more flexible frequency scheduling is reduced. For example, the type and position information of the RU allocated to the first assignment of 80 MHz OFDMA as illustrated in FIG. 11 can be indicated by "0001010".

According to the signaling of the RU type and position information illustrated in FIG. 13, in order to decode the type and position of each of the allocated RUs, a STA supporting CBW up to 20 MHz only needs to maintain a four-bit look up table Likewise, a STA supporting CBW up to 40 MHz only needs to maintain a six-bit look up table and a STA supporting CBW up to 80 MHz only needs to maintain a seven-bit look up table. As a result, the memory required for decoding the type and position information of each of allocated RUs is minimized for STAs with different PHY capabilities in terms of supported CBW.

According to the third embodiment, in case of 20 MHz non-OFDMA transmission, the number of allocated RUs shall be set to one and the type and position of allocated RU shall be set to the first Type IV RU. In case of 40 MHz non-OFDMA transmission, the number of allocated RUs shall be set to one and the type and position of allocated RU shall be set to the first Type V RU. In case of 80 MHz non-OFDMA transmission, the number of allocated RUs shall be set to one and the type and position of allocated RU shall be set to the first Type VI RU. In case of 80+80 MHz or 160 MHz non-OFDMA transmission, the number of allocated RUs shall be set to two and the type and position of allocated RUs shall be set to the first Type VI RU and the second Type VI RU, respectively. Consequently, STA shall be able to determine whether incoming DL PPDU 100 is an OFDMA PPDU or a non-OFDMA PPDU according to the resource assignment information without any dedicated signaling for such purpose.

[HE SIG Field]

Figure 14:
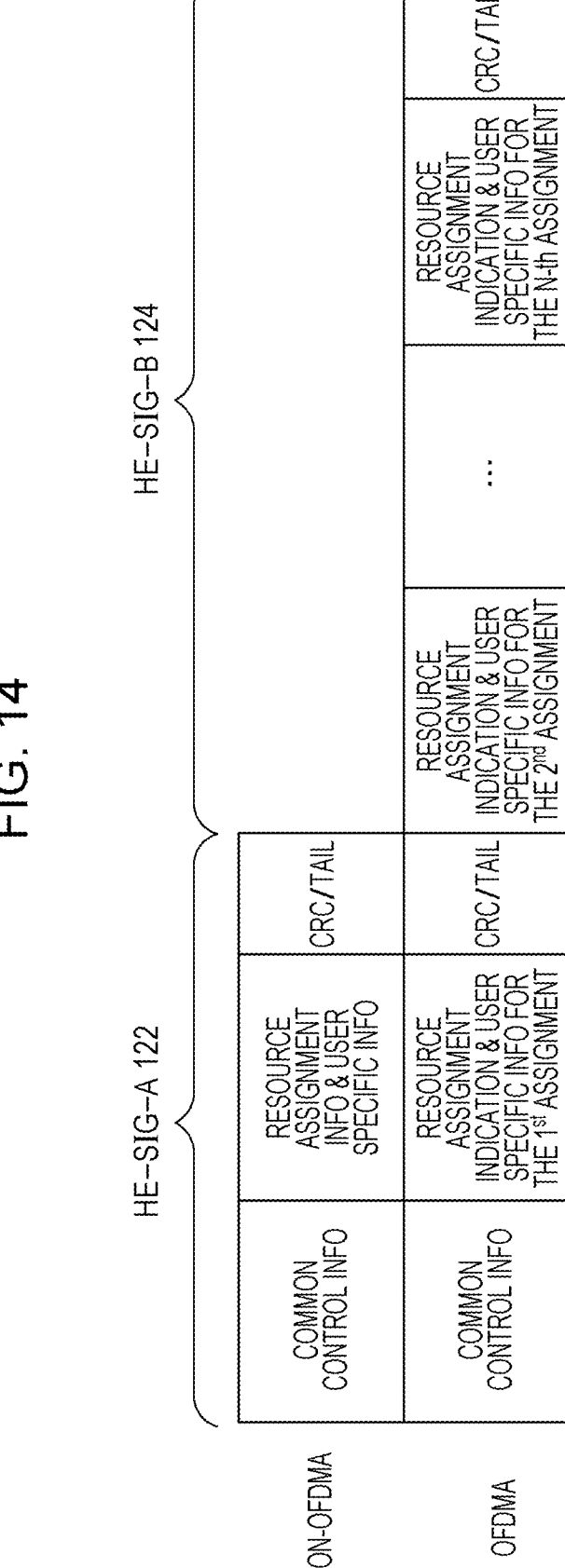
FIG. 14 shows a diagram illustrating example information content of HE-SIG-A and HE-SIG-B according to the present disclosure.

FIG. 14 illustrates an example of information content of HE-SIG-A 122 and HE-SIG-B 124 of DL PPDU 100 according to the present disclosure. Common control information is included in both the HE-SIG-A for non-OFDMA transmission and the HE-SIG-A for OFDMA transmission. According to the present disclosure, the information contained in the HE-SIG-A 122 for non-OFDMA transmission differs from the HE-SIG-A 122 for OFDMA transmission. In case of non-OFDMA transmission, in addition to the common control information, the HE-SIG-A field 122 contains resource assignment information and user specific information for single user transmission or multiuser MIMO transmission. The HE-SIG-B field 124 does not exist in case of non-OFDMA transmission in the data field 130. In case of OFDMA transmission in the data field 130, in addition to the common control information, the HE-SIG-A field 122 contains resource assignment indication and user specific information for the first assignment, and the HE-SIG-B field 124 contains resource assignment indication and user specific information for each of the remaining assignments.

According to the present disclosure, common control information includes CBW and GI (Guard Interval), etc. The user specific information is required for each scheduled STA to decode its payload, e.g., Group ID, Nsts (i.e., the number of space-time streams) and MCS (Modulation and Coding Scheme), etc.

According to the present disclosure, common control information further includes an assignment set ID that maps a plurality of resource assignments indicated by resource assignment information to scheduled STAs, which will be detailed later. As a result, after decoding HE-SIG-A 122 of a DL PPDU 100, if a STA determines that it is not addressed by the PPDU 100, it will ignore the remaining of the PPDU 100 and reduce its power consumption.

According to the present disclosure, the common control information may further include an Allocation Defined flag in conjunction with the assignment set ID. Assume a first DL PPDU and a subsequent second DL PPDU are associated with the same assignment set ID. The Allocation Defined flag of the second DL PPDU shall be set if the resource assignment information contained in the first DL PPDU can be reused by the second DL PPDU. In that case, the resource assignment information for the second DL PPDU can be omitted, and thus signaling overhead can be reduced.

According to the present disclosure illustrated in FIG. 14, the HE-SIG-A 122 contains similar information for non-OFDMA transmission and OFDMA transmission in the data field 130. This would reduce implementation complexity of STA.

According to the present disclosure illustrated in FIG. 14, when non-OFDMA transmission is performed in the data field 130, the HE-SIG-B 124 does not exist. As a result, STAs need not to decode HE-SIG-B 124, which leads to a reduced power consumption of STAs.

<Radio Communication System>

Figure 15:
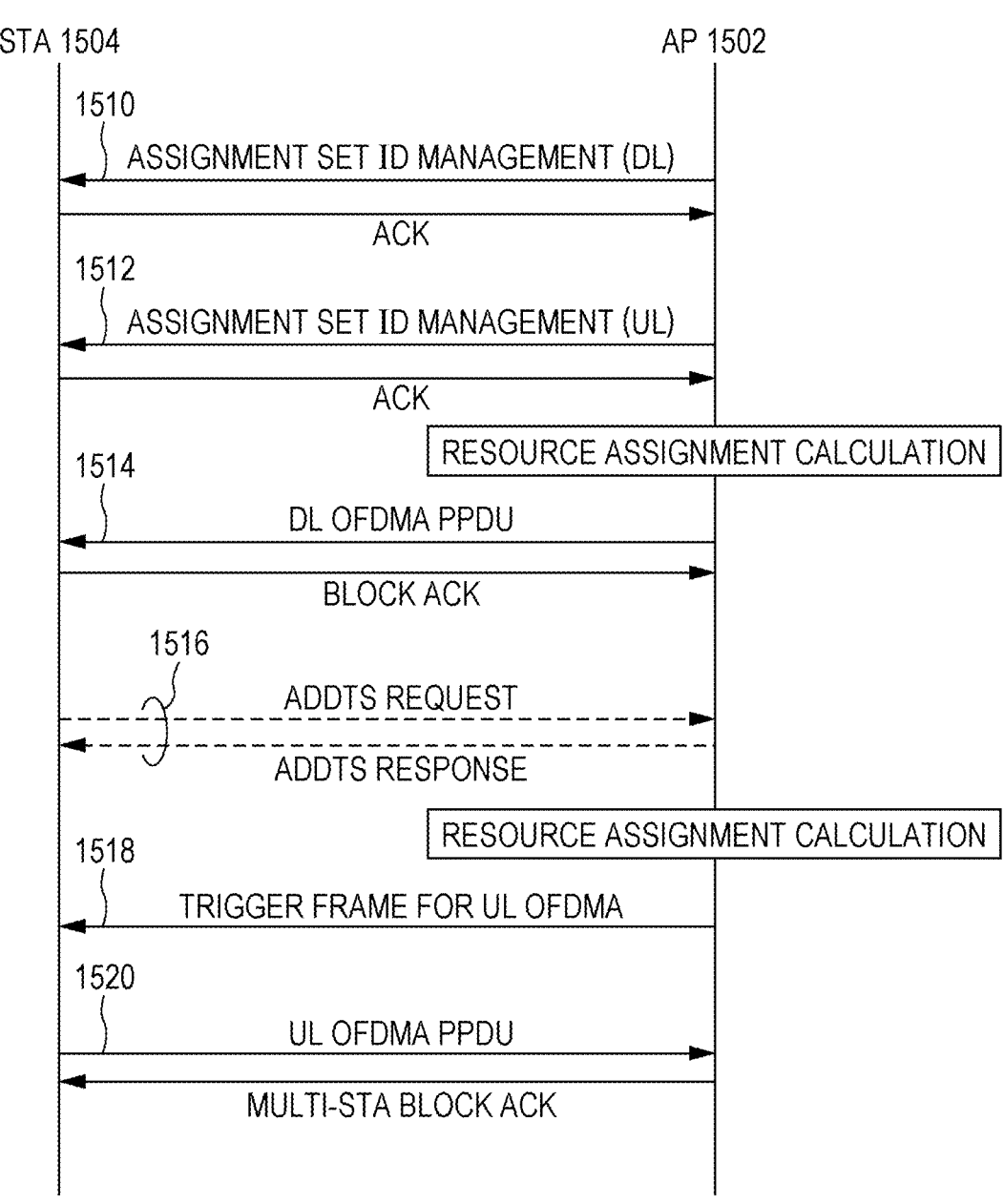
FIG. 15 shows a diagram illustrating an example sequence of executing OFDMA transmission according to the present disclosure.

FIG. 15 illustrates an example sequence of executing OFDMA transmission in a radio communication system according to the present disclosure. The radio communication system comprises an AP 1502 and a plurality of STAs (e.g., 1504) which are associated with AP 1502. AP 1502 performs frequency scheduling using the plurality of RUs in the radio communication system.

Prior to initiation of DL OFDMA transmission, AP 1502 determines possible combinations of STAs that can be addressed by a DL OFDMA PPDU by assigning STAs to DL assignment sets and to specific assignment indices within those sets. One assignment set is identified by an assignment set ID and refers to a plurality of STAs and a plurality of assignment indices where each of the plurality of assignment indices is addressed to one or more of the plurality of STAs. For example, one assignment set comprises two STAs (STA1 and STA2) and two assignments where the first assignment is addressed to STA1 and the second assignment is addressed to STA2. Then AP 1502 transmits an Assignment Set ID Management frame 1510 to STA 1504 to assign or change its assignment indices corresponding to one or more DL assignment sets of which STA 1504 is a member.

Prior to initiation of UL OFDMA transmission, AP 1502 determines the possible combinations of STAs that transmit a UL OFDMA PPDU by assigning STAs to UL assignment sets and to specific assignment indices within those sets. Then AP 1502 transmits an Assignment Set ID Management frame 1512 to STA 1504 to assign or change its assignment indices corresponding to one or more UL assignment sets of which STA 1504 is a member.

Figure 16:
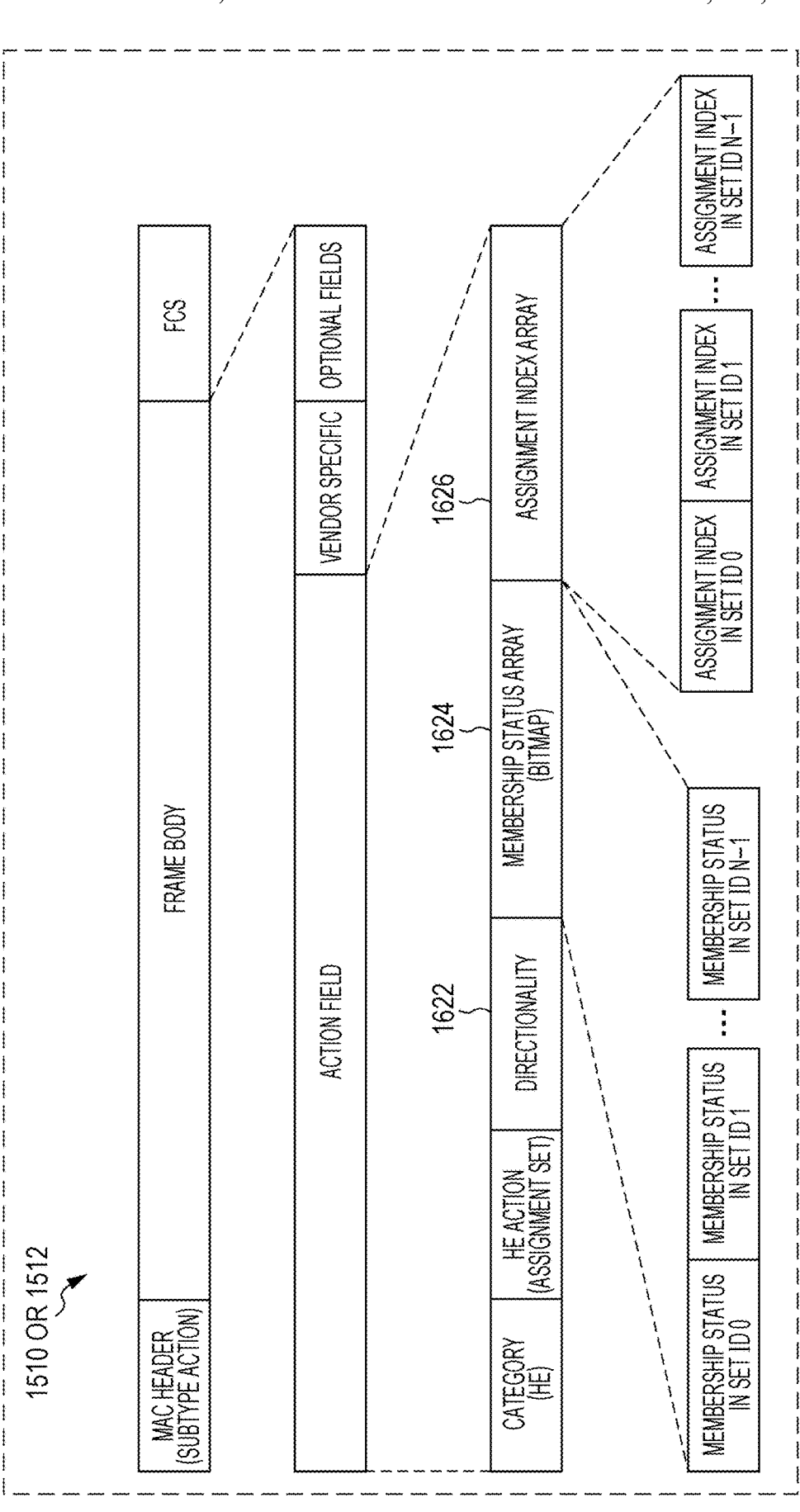
FIG. 16 shows a diagram illustrating an example format of Assignment Set ID Management frame according to the present disclosure.

FIG. 16 illustrates an example format of Assignment Set ID Management frame 1510 or 1512 according to the present disclosure. The frame 1510 comprises a Directionality field 1622, a Membership Status Array field 1624 and an Assignment Index Array field 1626. The Directionality field 1622 indicates whether OFDMA assignment sets are for DL or UL. STA 1504 may be assigned to multiple sets by setting multiple subfields of the Membership Status Array field 1624 to 1 in the frame 1510. An assignment index in each assignment set of which STA 1504 is a member is indicated by the associated subfield in the Assignment Index Array field 1626 in the frame 1510. For each Set ID, AP 1502 may assign the same assignment index to multiple STAs. STA 1504 shall have only one assignment index in each set of which it is a member.

According to the present disclosure, the AP 1502 may transmit the Assignment Set ID management frames to STA 1504 when it associates with the AP 1502. In addition, the AP 1502 may transmit the Assignment Set ID management frames to STA 1504 periodically or if necessary.

If only a specific combination of STAs is allowed to communicate with the AP 1502 in an OFDMA transmission for a period of time, a simple management frame can be used instead of the Assignment Set ID management frame to indicate an assignment index for each STA. In this case, the assignment set ID in the HE-SIG-A of DL PPDU or the trigger frame can be omitted.

If AP 1502 has buffered data addressed to STA 1504, AP 1502 selects a DL assignment set of which STA 1504 is a member and determines DL resource required to transmit the data addressed to STA 1504 based on the data size and QoS (Quality of Service) requirement. Then AP 1502 transmits a DL OFDMA PPDU 1514 which includes the data addressed to STA 1504, assignment set ID of the selected DL assignment set as well as other control information (e.g., resource assignment information) which is required by STA 1504 to decode its data inside the DL OFDMA PPDU 1514. Note that when a subsequent DL OFDMA PPDU which includes the same assignment set ID as the DL OFDMA PPDU 1514 is transmitted, if the resource assignment information contained in the DL OFDMA PPDU 1514 can be reused by the subsequent DL OFDMA PPDU, the Allocation Defined flag in the subsequent DL OFDMA PPDU shall be set and then resource assignment information needs not to be included in the subsequent DL OFDMA PPDU.

If STA 1504 has buffered data addressed to AP 1502, STA 1504 may perform ADDTS Request/Response frame exchange 1516 with AP 1502 to request transmission bandwidth for its data. ADDTS Request frame may also include information on RUs, for example, channel quality information to show which RUs are preferable or not preferable for the STA 1504. Then AP 1502 selects a UL assignment set of which STA 1504 is a member and determines UL resource according to the requested transmission bandwidth by STA 1504. After that, AP 1502 transmits a trigger frame 1518 to STA 1504 which includes assignment set ID of the selected UL assignment set as well as other control information (e.g., resource assignment information) which is required by STA 1504 to transmit its data. Note that when a subsequent trigger frame which includes the same assignment set ID as the trigger frame 1518 is transmitted, if the resource assignment information contained in the trigger frame 1518 can be reused by the subsequent trigger frame, the Allocation Defined flag in the subsequent trigger frame shall be set and then resource assignment information needs not to be included in the subsequent trigger frame. The trigger frame may also include UL transmission power control information and UL transmission duration information. After receiving the trigger frame 1518, STA 1504 transmits a UL OFDMA PPDU 1520 to send its data using the designated resource accordingly. STA 1504 may control its transmission power based on the transmission power control information so that, at the AP 1502, large variation between reception power from each STA can be avoided.

<Configuration of an Access Point>

Figure 17:
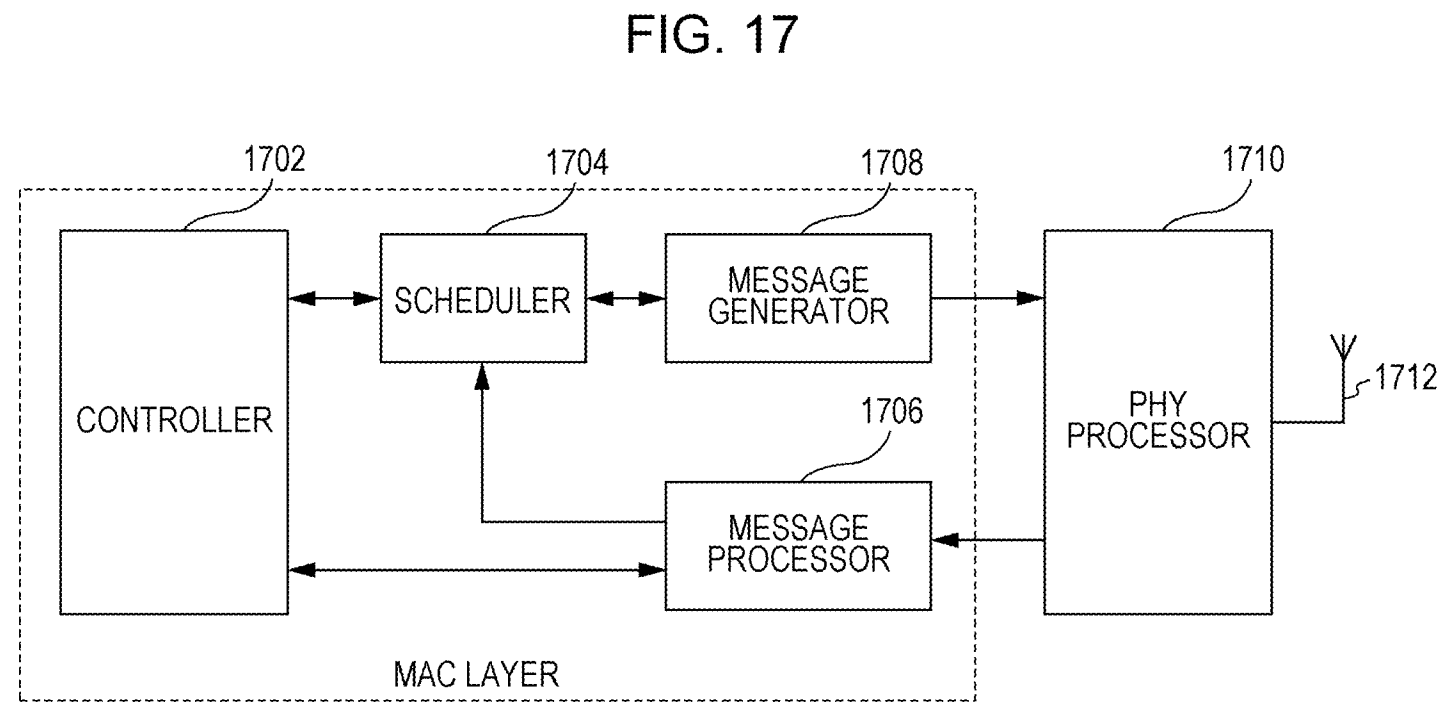

FIG. 17 is a block diagram illustrating example configuration of AP 1502 according to the present disclosure. The AP 1502 comprises a controller 1702, a scheduler 1704, a message generator 1708, a message processor 1706, a PHY processor 1710 and an antenna 1712. The controller 1702 is a MAC protocol controller and controls general MAC protocol operations.

For DL OFDMA transmission, scheduler 1704 performs frequency scheduling under the control of the controller 1702 based on channel quality indicators (CQIs) from STAs and assigns data for STAs to RUs. Examples of a CQI-based scheduling method include the Max CIR method and the proportional-fairness method. Scheduler 1704 also outputs the resource assignment results to the message generator 1708. The message generator 1708 generates corresponding common control information, resource assignment information, user specific information and data for scheduled STAs, which are formulated by the PHY processor 1710 into an OFDMA PPDU and transmitted through the antenna 1712. The resource assignment information can be configured according to the above mentioned embodiments. On the other hand, the message processor 1706 analyzes the received CQIs from STAs through the antenna 1712 under the control of the controller 1702 and provides them to scheduler 1704 and controller 1702. These CQIs are received quality information reported from the STAs. Further, each STA can measure received quality on a per RU basis using the received SNR, received SIR, received SINR, received CINR, received power, interference power, bit error rate, throughput and MCS whereby a predetermined error rate can be achieved. Furthermore, the CQI may also be referred to as "CSI" (Channel State Information).

For UL OFDMA transmission, scheduler 1704 performs frequency scheduling under the control of the controller 1702 based on transmission bandwidth request from STAs and assigns resource for scheduled STAs for UL data transmission. At the same time, scheduler 1704 may also perform time scheduling to determine duration of UL OFDMA frame or transmission opportunity (TXOP) in which STAs have a right to perform UL OFDMA frame exchanges. Scheduler 1704 also outputs the resource assignment results to the message generator 1708. The message generator 1708 generates a trigger frame including common control information, resource assignment information and user specific information, which is formulated by the PHY processor 1710 into a DL PPDU and transmitted through the antenna 1712. On the other hand, the message processor 1706 analyzes the received transmission bandwidth request from STAs through the antenna 1712 and provides them to scheduler 1704 and controller 1702. The antenna 1712 can be comprised of one antenna port or a combination of a plurality of antenna ports.

<Configuration of a STA>

Figure 18:
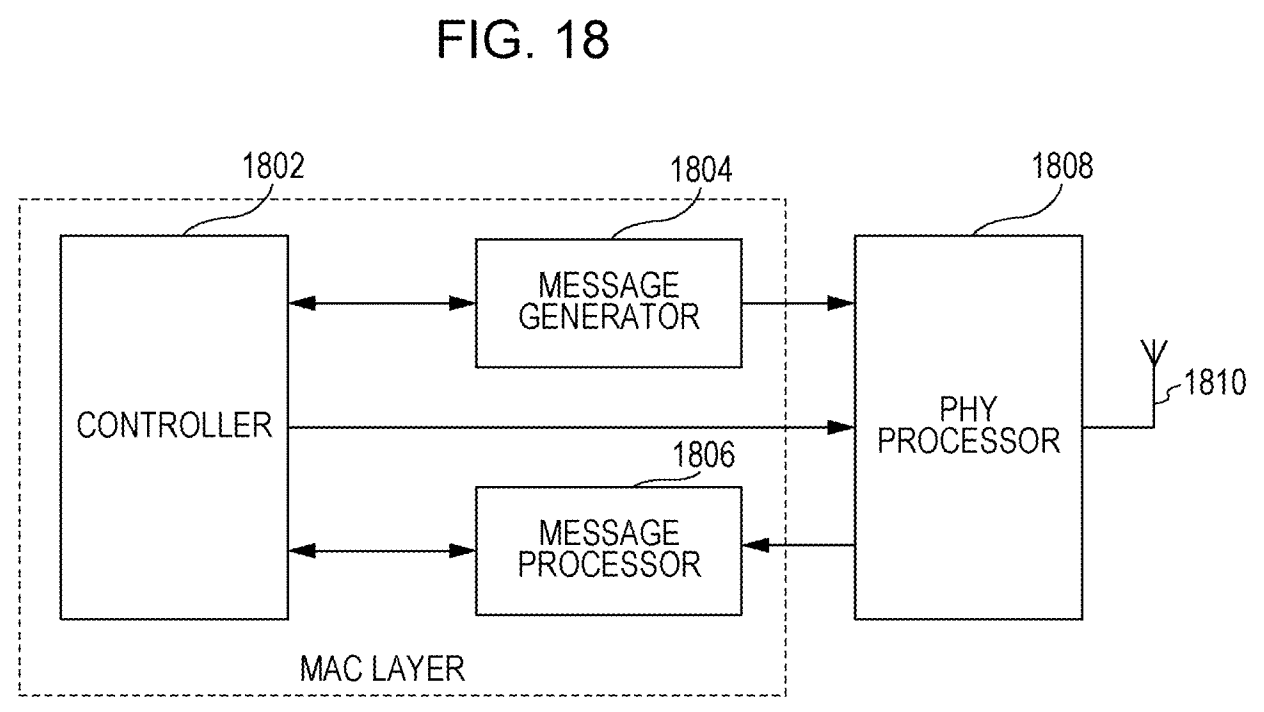

FIG. 18 is a block diagram illustrating example configuration of STA 1504 according to the present disclosure. STA 1504 comprises a controller 1802, a message generator 1804, a message processor 1806, a PHY processor 1808 and an antenna 1810. The controller 1802 is a MAC protocol controller and controls general MAC protocol operations. The antenna 1810 can be comprised of one antenna port or a combination of a plurality of antenna ports.

For UL OFDMA transmission, the message processor 1806 analyzes the received trigger frame from AP 1502 through the antenna 1810 and provides common control information, resource assignment information and user specific information to controller 1802. The resource assignment information can be configured according to the above mentioned embodiments. The message generator 1804 generates data under the control of the controller 1802, which are formulated by the PHY processor 1808 under the control of the controller 1802 into an UL OFDMA PPDU in such a way that the data is transmitted at the designated resource. The UL OFDMA PPDU is transmitted through the antenna 1810.

For DL OFDMA transmission, the message processor 1806 estimates channel quality from the received DL PPDU through the antenna 1810 and provides them to controller 1802. The message generator 1804 generates CQI message, which is formulated by the PHY processor 1808 into an UL PPDU and transmitted through the antenna 1810.

Fourth Embodiment

Figure 19:
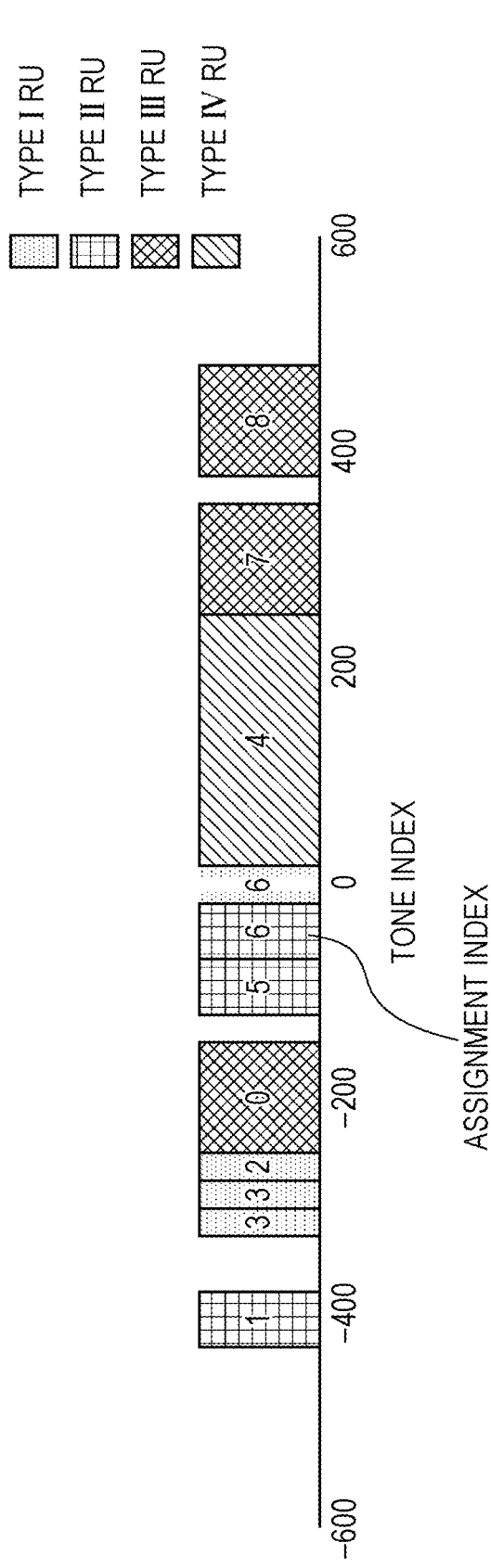
FIG. 19 shows a diagram illustrating an example of resource assignment according to a fourth embodiment of the present disclosure.

FIG. 19 illustrates an example of resource assignment according to a fourth embodiment of the present disclosure. The fourth embodiment is applicable to continuous resource allocation where one or more RUs that are consecutive in the frequency domain can be allocated in one assignment. In this example, there are nine assignments (#0 to #9) in the 80 MHz OFDMA. Each assignment is addressed to either a specific STA in terms of single user transmission or a specific group of STAs in terms of multiuser MIMO transmission.

According to the fourth embodiment, the total number of assignments may be negotiated in advance between an AP and one or more STAs or may be explicitly signaled to each STA in the HE-SIG-A field of DL PPDU or the trigger frame.

Unlike the first and second embodiments where the start tone index of an assignment is always larger than the end tone index of its preceding assignment, there is no such restriction in the fourth embodiment. The start tone index and the end tone index of an assignment can be smaller than the first tone index of another preceding assignment. As a result, the scheduling flexibility is improved in the fourth embodiment.

According to the fourth embodiment, the resource assignment information includes a plurality of resource assignment indications, each of which corresponds to a particular assignment.

FIG. 20A illustrates a first example of resource assignment indication for one assignment according to the fourth embodiment of the present disclosure. The resource assignment indication for one assignment contains the number of allocated RUs, the position and type of the first allocated RU and the type of each of remaining allocated RUs. In other words, each resource assignment indication contains position and type information of the first RU only and type information of each of the remaining RUs. The start position for an assignment can be determined according to the position of the first allocated RU. Further, the allocation bandwidth for the assignment can be determined according to the number of allocated RUs and the type of each of allocated RUs.

FIG. 20B illustrates a second example of resource assignment indication for one assignment according to the fourth embodiment of the present disclosure. In this example, only the same type of RUs can be allocated in one assignment. The resource assignment indication for the assignment contains the number of allocated RUs and the position and type of the first allocated RU. The start position for an assignment can be determined according to the position of the first allocated RU. Further, the allocation bandwidth for the assignment can be determined according to the number of allocated RUs and the type of the first allocated RU.

Two-bit signaling shown in Table 1 can be used to indicate the number of allocated RUs, and three-bit signaling shown in Table 2 can be used to indicate the RU type. The type and position of the first allocated RU can be jointly signalled in a single signaling field as illustrated in FIG. 13.

[HE SIG Field]

Figure 21:
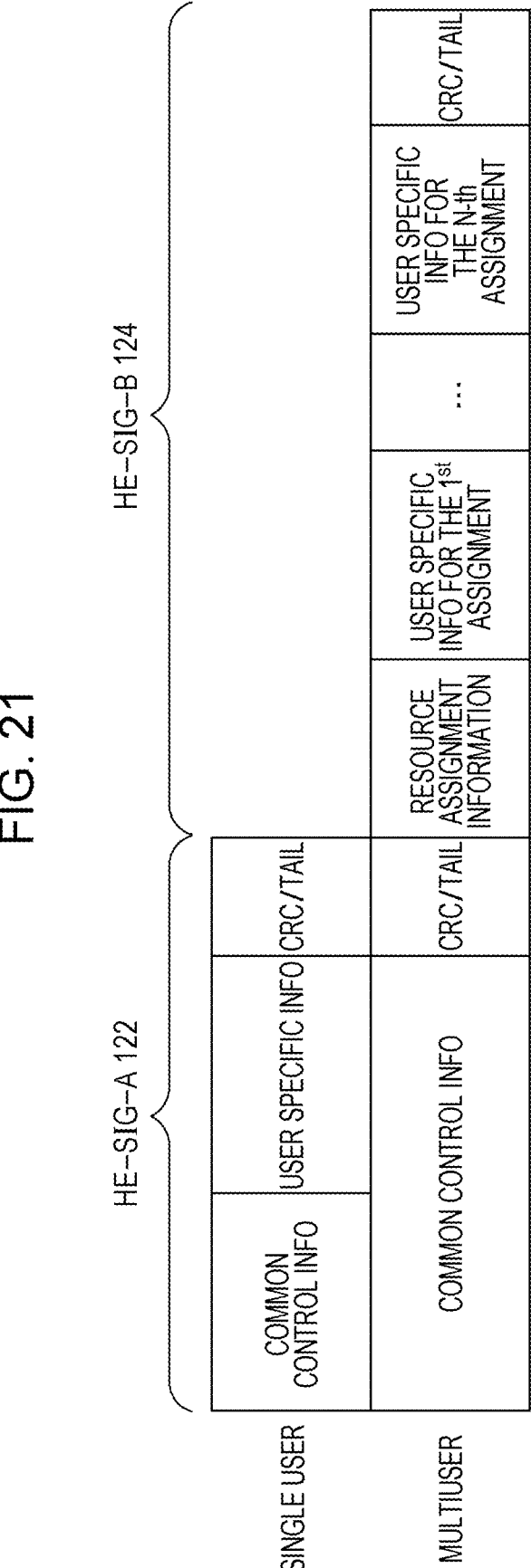
FIG. 21 shows a diagram illustrating another example of information content of HE-SIG-A and HE-SIG-B according to the present disclosure.

FIG. 21 illustrates another example of information content of HE-SIG-A 122 and HE-SIG-B 124 of DL PPDU according to the present disclosure. According to the present disclosure, the HE-SIG-B field 124 does not exist in the DL PPDU in case of single user transmission. In case of multiuser transmission, the HE-SIG-B field 124 exists in the DL PPDU and contains resource assignment information (i.e., resource assignment indication for each assignment), followed by user specific information for each assignment. The HE-SIG-B field 124 is encoded on a per 20 MHz subband basis. For CBW=40 MHz, 80 MHz, 160 MHz or 80+80 MHz, the number of 20 MHz subbands carrying different content is two.

Figure 22:
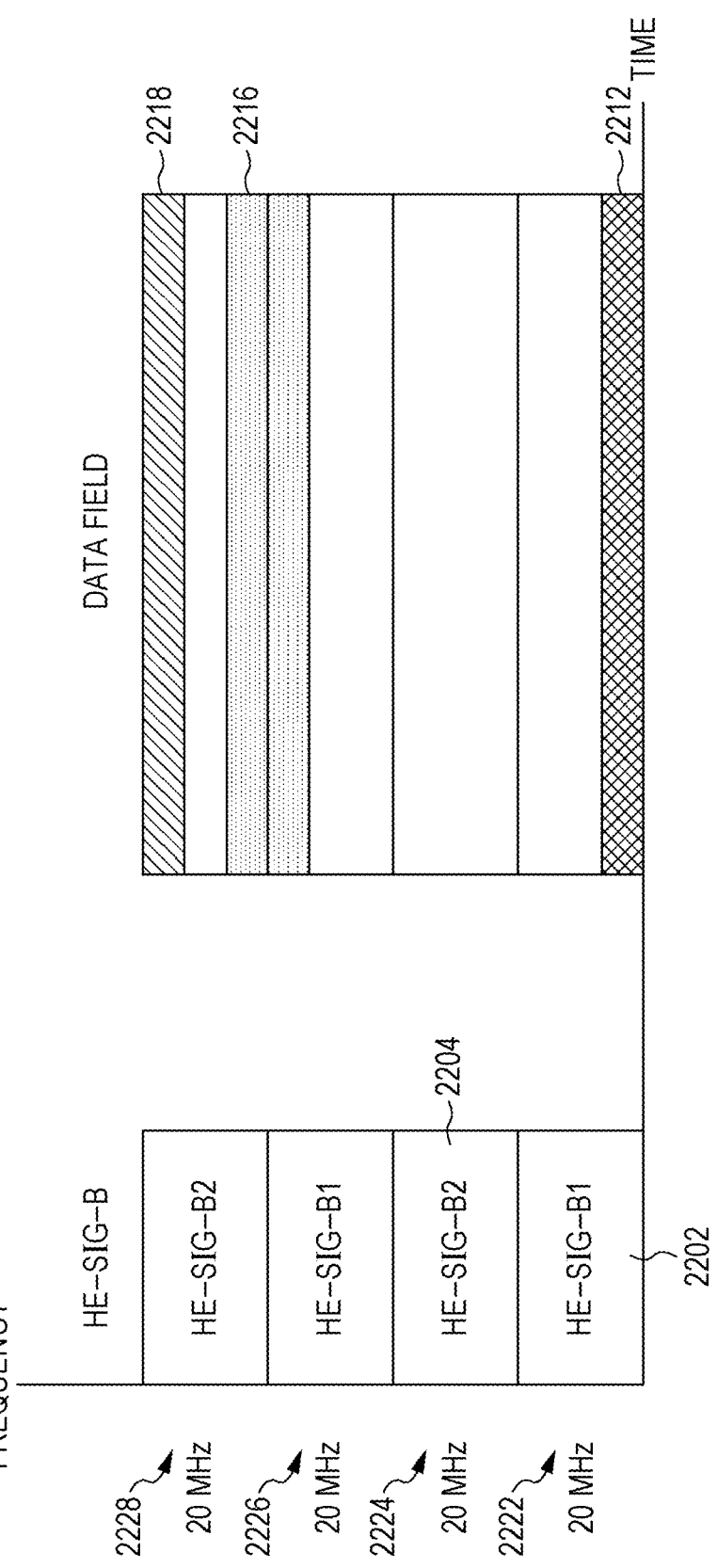
FIG. 22 shows a diagram illustrating an example structure of HE-SIG-B according to the present disclosure.

An example structure of the HE-SIG-B field 124 in FIG. 21 in case of CBW=80 MHz is illustrated in FIG. 22. The HE-SIG-B field 124 comprises two portions: HE-SIG-B1 2202 and HE-SIG-B2 2204. The HE-SIG-B1 2202 is transmitted over the first 20 MHz subband channel 2222 and a duplicate of the HE-SIG-B 2202 is transmitted over the third 20 MHz subband channel 2226 while the HE-SIG-B2 2204 is transmitted over the second 20 MHz subband channel

2224 and a duplicate of the HE-SIG-B2 2204 is transmitted over the fourth 20 MHz subband channel 2228.

According to the present disclosure, resource assignment indication for one assignment that is fully located within a 20 MHz subband channel should be carried in one of the HE-SIG-B1 2202 and HE-SIG-B2 2204 that is transmitted over the same 20 MHz subband channel. In more details, the HE-SIG-B1 2202 should carry resource assignment indications for the assignments (e.g., 2212) that are fully located within the first 20 MHz subband channel 2222 or the third 20 MHz subband channel 2226. The HE-SIG-B2 2204 should carry resource assignment indications for the assignments (e.g., 2218) that are fully located within the second 20 MHz subband channel 2224 or the fourth 20 MHz subband channel 2228. In this way, even if control signaling in a 20 MHz subband channel (e.g., 2222 or 2226) is corrupted due to interference, the DL PPDU in another 20 MHz subband channel (e.g., 2224 or 2228) can be decoded correctly.

According to the present disclosure, for the assignments (e.g., 2216) that span across two or more neighboring 20 MHz subband channels, the corresponding resource assignment indications can be carried either in the HE-SIG-B1 2202 or in the HE-SIG-B2 2204 such that data amount of the HE-SIG-B1 2202 and data amount of the HE-SIG-B2 2204 become similar in size. Since smaller one of the HE-SIG-B1 and the HE-SIG-B2 will be appended padding bits until their payload sizes become the same, the padding efficiency of HE-SIG-B field can be improved or maximized according to this embodiment.

Figure 23:
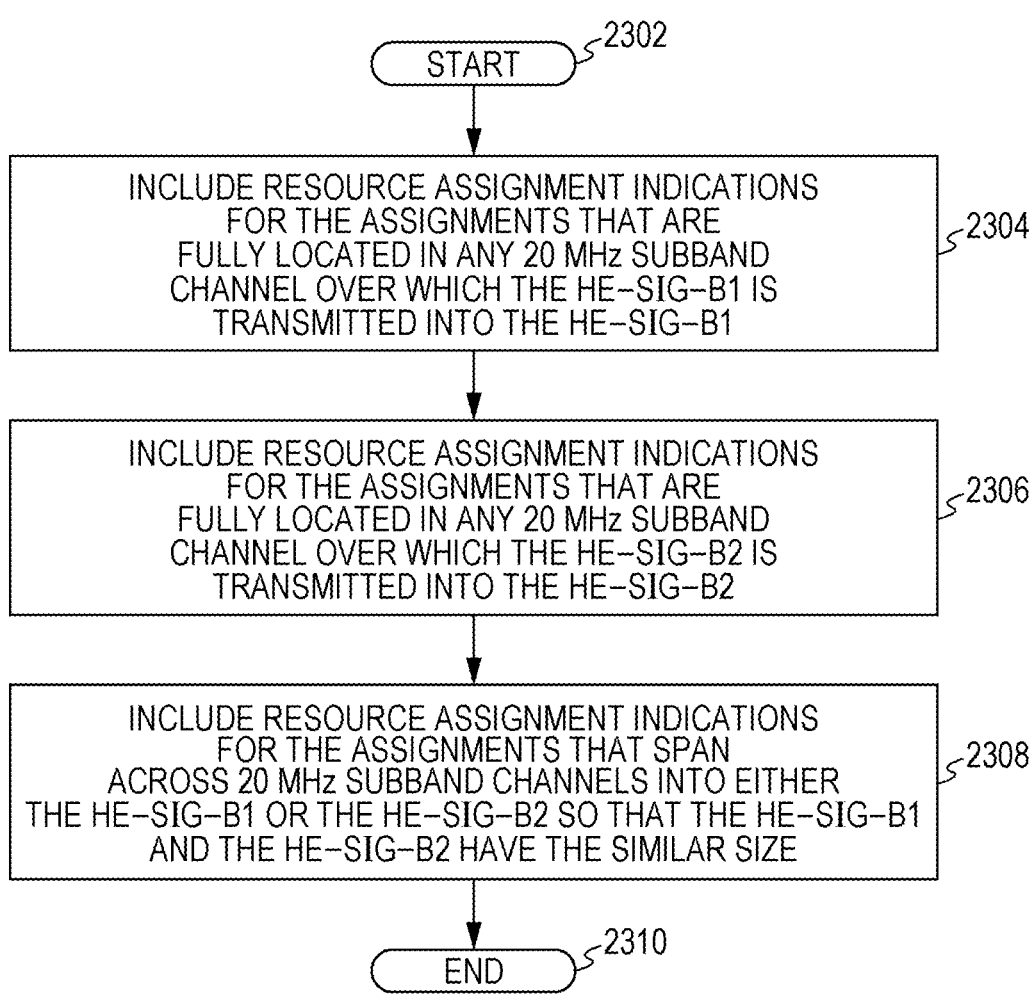
FIG. 23 shows a flow chart illustrating a method for distributing resource assignment information into HE-SIG-B field according to the present disclosure.

FIG. 23 is a flow chart illustrating a method for distributing resource assignment information into the HE-SIG-B field according to the present disclosure. The method shown in FIG. 23 starts at Step 2302. At Step 2304, resource assignment indications for the assignments that are fully located in any 20 MHz subband channel over which the HE-SIG-B1 is transmitted are included (i.e., mapped) in the HE-SIG-B1. At Step 2306, resource assignment indications for the assignments that are fully located in any 20 MHz subband channel over which the HE-SIG-B2 is transmitted are included (i.e., mapped) in the HE-SIG-B2. Note that the sequential order of Step 2304 and Step 2306 may be interchangeable. At Step 2308, resource assignment indications for the assignments that span across two or more neighboring 20 MHz subband channels are included (i.e., mapped) in either the HE-SIG-B1 or the HE-SIG-B2 so that data amount of the HE-SIG-B1 and data amount of the HE-SIG-B2 become similar in size. This method stops at Step 2310.

Take the following case as an example:
CBW=40 MHz;
Four assignments: A1, A2, A3 and A4;
Assignment A1 contains one or more RUs that are located in the lower 20 MHz subband channel over which the HE-SIG-B1 is transmitted;
Each of assignments A2 and A3 contains one or more RUs that are located in the upper 20 MHz subband channel over which the HE-SIG-B2 is transmitted;
Assignment A4 contains one or more RUs that span across both of the lower and the upper 20 MHz subband channels; and
Assume that resource assignment indication for each of four assignments requires the similar number of information bits.

According to the method illustrated in FIG. 23, resource assignment indications for the above four assignments should be distributed into the HE-SIG-B as follows:

Resource assignment indication for assignment A1 is signaled in the HE-SIG-B1;
Resource assignment indications for assignments A2 and A3 are signaled in the HE-SIG-B2; and
Resource assignment indication for assignment A4 is signaled in the HE-SIG-B1.

By distributing resource assignment indications between the HE-SIG-B1 and the HE-SIG-B2, data amount of the HE-SIG-B1 and data amount of the HE-SIG-B2 become similar in size, thus improving padding efficiency in the HE-SIG-B field.

[HE-SIG-B Field]

FIG. 24 illustrates a first example format of the HE-SIG-B1 2202 or the HE-SIG-B2 2204 in FIG. 22 in case of CBW=80 MHz. The HE-SIG-B1 2202 or the HE-SIG-B2 2204 comprises a common field 2410 and a user-specific field 2450. The common field 2410 comprises a first resource assignment subfield 2412, a second resource assignment subfield 2414, a CRC (Cyclic Redundancy Check) subfield 2418 and a tail bits subfield.

In context of the HE-SIG-B1 2202, the first resource assignment subfield 2412 contains a RU arrangement pattern index which indicates a specific RU arrangement in the frequency domain (including MU-MIMO (Multiuser Multiple Input Multiple Output) related information) for the first 20 MHz subband channel 2222 in FIG. 22. The mapping of RU arrangement pattern indices and the corresponding RU arrangement patterns is predetermined. An example mapping of RU arrangement pattern indices and the corresponding RU arrangement patterns is shown in Table 5. Note that RUs are arranged from lower frequency to higher frequency in the frequency domain within a 20 MHz subband channel and Type I RUs and Type II RUs can be used for SU-MIMO transmission only.

TABLE 5

| RU Arrangement Pattern Index | RU Arrangement Pattern |
|---|---|
| 0 | 9 Type I RUs |
| 1 | 1 Type II RU, followed by 7 Type I RUs |
| 2 | 2 Type I RUs, followed by 1 Type II RU and 5 Type I RUs |
| 3 | 5 Type I RUs, followed by 1 Type II RU and 2 Type I RUs |
| 4 | 7 Type I RUs, followed by 1 Type II RU |
| 5 | 2 Type II RUs, followed by 5 Type I RUs |
| 6 | 1 Type II RU, followed by 3 Type I RUs, 1 Type II RU and 2 Type I RUs |
| 7 | 1 Type II RU, followed by 5 Type I RUs and 1 Type II RU |
| 8 | 2 Type I RUs, followed by 1 Type II RU, 1 Type I RU, 1 Type II RU and 2 Type I RUs |
| 9 | 2 Type I RUs, followed by 1 Type II RU, 3 Type I RUs and 1 Type II RU |
| 10 | 5 Type I RUs, followed by 2 Type II RUs |
| 11 | 2 Type II RUs, followed by 1 Type I RU, 1 Type II RU and 2 Type I RUs |
| 12 | 2 Type II RUs, followed by 3 Type I RUs and 1 Type II RU |
| 13 | 1 Type II RU, followed by 3 Type I RUs and 2 Type II RUs |
| 14 | 2 Type I RUs, followed by 1 Type II RU, 1 Type I RU and 2 Type II RUs |
| 15 | 2 Type II RUs, followed by 1 Type I RU and 2 Type II RUs |
| 16 | 1 Type III RU for SU-MIMO transmission, followed by 5 Type I RUs |
| 17 | 1 Type III RU for SU-MIMO transmission, followed by 3 Type I RUs and 1 Type II RU |
| 18 | 1 Type III RU for SU-MIMO transmission, followed by 1 Type I RU, 1 Type II RU and 2 Type I RUs |
| 19 | 1 Type III RU for SU-MIMO transmission, followed by 1 Type I RU and 2 Type II RUs |
| 20 | 1 Type III RU for SU-MIMO transmission, followed by 1 Type I RU and 1 Type III RU for SU-MIMO transmission |

TABLE 5-continued

| RU Arrangement Pattern Index | RU Arrangement Pattern |
|---|---|
| 21 | 5 Type I RUs, followed by 1 Type III RU for SU-MIMO transmission |
| 22 | 1 Type II RU, followed by 3 Type I RUs and 1 Type III RU for SU-MIMO transmission |
| 23 | 2 Type I RUs, followed by 1 Type II RU, 1 Type I RU and 1 Type III RU for SU-MIMO transmission |
| 24 | 2 Type II RUs, followed by 1 Type I RU and 1 Type III RU for SU-MIMO transmission |
| 25 | 5 Type I RUs, followed by 1 Type III RU for MU-MIMO transmission with 2 users multiplexed |
| 26 | 5 Type I RUs, followed by 1 Type III RU for MU-MIMO transmission with 3 users multiplexed |
| 27 | 5 Type 1 RUs, followed by 1 Type III RU for MU-MIMO transmission with 4 users multiplexed |
| 28 | 5 Type 1 RUs, followed by 1 Type III RU for MU-MIMO transmission with 5 users multiplexed |
| 29 | 5 Type 1 RUs, followed by 1 Type III RU for MU-MIMO transmission with 6 users multiplexed |
| 30 | 5 Type I RUs, followed by 1 Type III RU for MU-MIMO transmission with 7 users multiplexed |
| 31 | 5 Type I RUs, followed by 1 Type III RU for MU-MIMO transmission with 8 users multiplexed |
| . . . | . . . |

With reference to Table 1, for example, the first resource assignment subfield 2412 may contain a RU arrangement pattern index 25 to indicate a specific RU arrangement for the first 20 MHz subband channel where five Type I RUs followed by one Type III RU in the frequency domain, and each of five Type I RUs is used for SU-MIMO (Single User Multiple Input Multiple Output) transmission while the Type III RU is used for MU-MIMO transmission with two users multiplexed. The second resource assignment subfield 2414 indicates the RU arrangement in the frequency domain and MU-MIMO related information for the third 20 MHz subband channel 2226 in FIG. 22.

In context of the HE-SIG-B2 2204, the first resource assignment subfield 2412 indicates the RU arrangement in the frequency domain and MU-MIMO related information for the second 20 MHz subband channel 2224 in FIG. 22. The second resource assignment subfield 2414 indicates the RU arrangement in the frequency domain and MU-MIMO related information for the fourth 20 MHz subband channel 2228 in FIG. 22. It should be noted that the RU arrangement signaled by the first resource assignment subfield 2412 and the second resource assignment subfield 2414 does not involve the center Type I RU 402 as illustrated in FIG. 4, which is located between two adjacent 20 MHz subband channels.

The user-specific field 2450 comprises a plurality of BCC (Binary Convolutional Coding) blocks 2460. Each of the BCC blocks 2460 except the last BCC block 2460-N comprises a first user-specific subfield, a second user-specific subfield, a CRC subfield and a tail bits subfield. The last BCC block 2460-N may comprise a single user-specific subfield. Each of user-specific subfields in the user-specific field 2450 carries per-user allocation information (e.g., STA identifier for addressing and the information necessary for decoding the PPDU 100 such as the number of spatial streams and modulation and coding scheme, etc). For each RU assigned for SU-MIMO transmission, there is only a single corresponding user-specific subfield. For each RU assigned for MU-MIMO transmission with K users multiplexed, there are K corresponding user-specific subfields. The ordering of user-specific subfields in the user-specific field 2450 is compliant with the RU arrangement signaled by the first resource assignment subfield 2412 and the second resource assignment subfield 2414.

According to the present disclosure, one of the user-specific subfields of the user-specific field 2450 in each of the HE-SIG-B1 2022 and the HE-SIG-B2 2024 is used to carry per-user allocation information for the center Type I RU 402 as illustrated in FIG. 4. The user-specific subfield for the center Type I RU shall be located at a predetermined position in the user-specific field 2450. For example, the user-specific subfield for the center Type I RU is the last user-specific subfield 2470 in the user-specific field 2450.

According to the present disclosure, the number of the user-specific subfields in the user-specific field 2450 except the user-specific subfield for the center Type I RU can be derived from the first resource assignment subfield 2412 and the second resource assignment subfield 2414 in the common field 2410.

In case of CBW=160 MHz or 80+80 MHz, there is a center Type I RU that is located between two adjacent 20 MHz subband channels for every 80 MHz. As a result, there are two center Type-I RUs in total in case of CBW=160 MHz or 80+80 MHz. In this case, according to the present disclosure, two of the user-specific subfields of the user-specific field 2450 in each of the HE-SIG-B1 2022 and the HE-SIG-B2 2024 are used to carry per-user allocation information for the two center Type I RUs, respectively. Each of the two user-specific subfields for the center Type I RUs shall be located at a predetermined position in the user-specific field 2450. For example, the user-specific subfield for a first center Type I RU is the last user-specific subfield in the user-specific field 2450 while the user-specific subfield for a second center Type I RU is the second last user-specific subfield in the user-specific field 2450.

Figure 25:
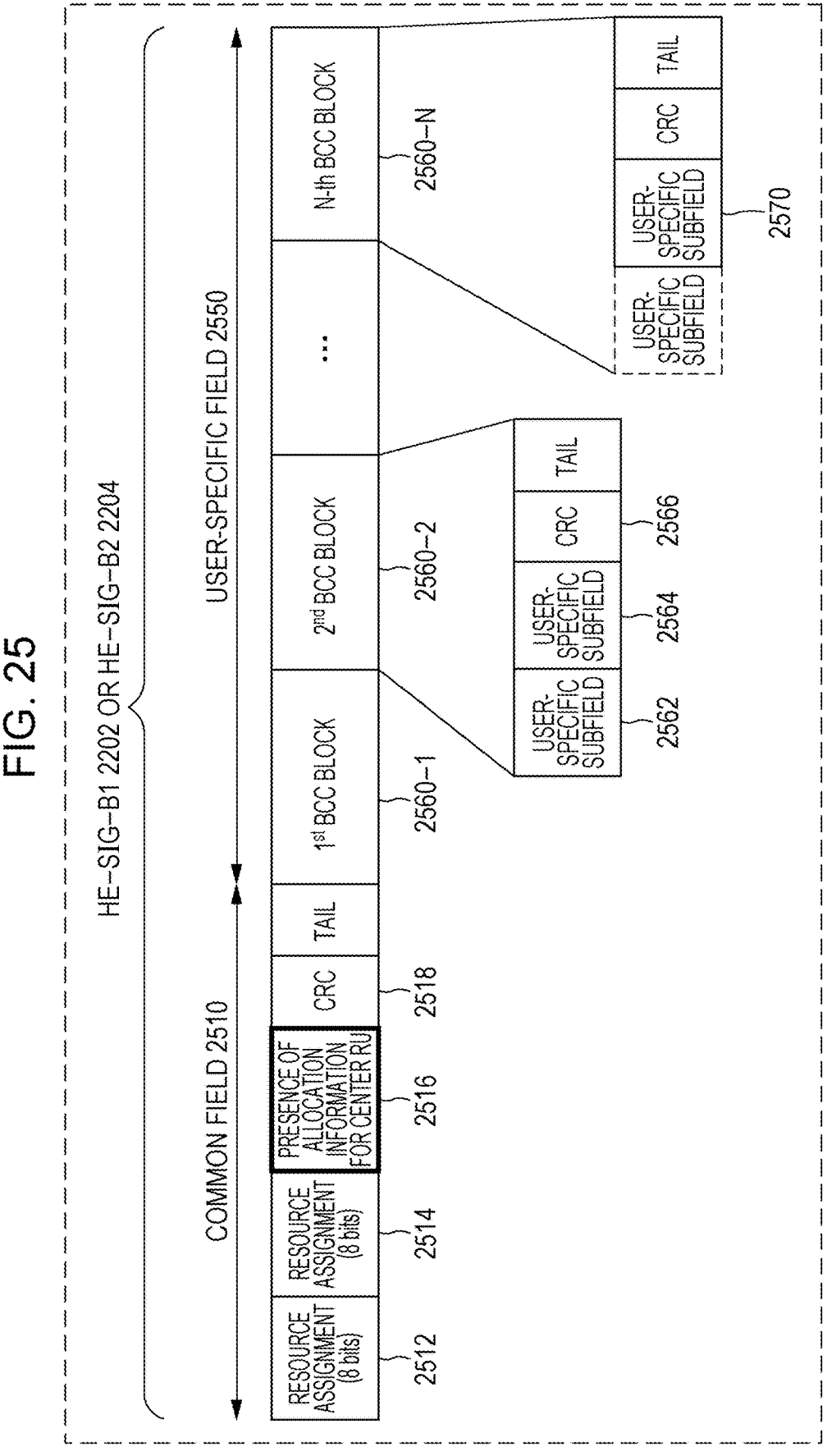
FIG. 25 shows a diagram illustrating a second example format of the HE-SIG-B1 or the HE-SIG-B2 in case of CBW=80 MHz.

FIG. 25 illustrates a second example format of the HE-SIG-B1 2202 or the HE-SIG-B2 2204 in FIG. 22 in case of CBW=80 MHz. The HE-SIG-B1 2202 or the HE-SIG-B2 2204 comprises a common field 2510 and a user-specific field 2550. The common field 2510 comprises a first resource assignment subfield 2512, a second resource assignment subfield 2514, a presence of allocation information for center RU subfield 2516, a CRC subfield 2518 and a tail bits subfield. The user-specific field 2550 comprises a plurality of BCC blocks 2560. Each of the BCC blocks 2560 except the last BCC block 2560-N comprises a first user-specific subfield, a second user-specific subfield, a CRC subfield and a tail bits subfield. The last BCC block 2560-N may comprise a single user-specific subfield. Each of the user-specific subfields in the user-specific field 2450 carries per-user allocation information.

The first resource assignment subfield 2512, the second resource assignment subfield 2514 and each of user-specific subfields are defined in the same way as their respective counterparts in FIG. 24.

According to the present disclosure, the presence of allocation information for center RU subfield 2516 in the common field 2510 is used to indicate whether there is a user-specific subfield for the center Type I RU in the user-specific field 2550. If a user-specific subfield for the center Type I RU is present in the user-specific field 2550, its position in the user-specific field 2550 shall be predetermined. For example, the user-specific subfield for the center Type I RU is the last user-specific subfield 2570 in the user-specific field 2550.

According to the present disclosure, the number of user-specific subfields in the user-specific field 2550 can be derived from the first resource assignment subfield 2512, the second resource assignment subfield 2514 and the presence of allocation information for center RU subfield 2516 in the common field 2510.

Compared with the first example format of the HE-SIG-B1 2202 or the HE-SIG-B2 2204 as illustrated in FIG. 24 where the user-specific subfield for the center Type I RU is included in both the HE-SIG-B1 2202 and the HE-SIG-B2 2204, the second example format as illustrated in FIG. 25 enables more flexible arrangement of user-specific subfield for the center Type I RU in the HE-SIG-B1 2202 and the HE-SIG-B2 2204. For one example, the user-specific subfield for the center Type I RU may be included in either of the HE-SIG-B1 2202 and the HE-SIG-B2 2204 for the purpose of keeping load balancing between the HE-SIG-B1 2202 and the HE-SIG-B2 2204 and improving channel efficiency. In other words, the user-specific subfield for the center Type I RU may be included in either of the HE-SIG-B1 2202 and the HE-SIG-B2 2204 so that the difference in terms of the number of user-specific subfields between the HE-SIG-B1 2202 and the HE-SIG-B2 2204 is minimized. For another example, the user-specific subfield for the center Type I RU may be included in both of the HE-SIG-B1 2202 and the HE-SIG-B2 2204 for the purpose of improving reliability for decoding the user-specific subfield for the center Type I RU.

In case of CBW=160 MHz or 80+80 MHz, the presence of allocation information for center RU subfield 2516 in the common field 2510 needs to indicate whether there is a user-specific subfield for each of the two center Type I RUs in the user-specific field 2550. If the user-specific subfield for only one of the two center Type I RUs is present in the user-specific field 2550, its position in the user-specific field 2550 shall be predetermined. For example, the user-specific subfield for the center Type I RU is the last user-specific subfield in the user-specific field 2550. If the user-specific subfield for each of the two center Type I RUs is present in the user-specific field 2550, the two user-specific subfields for the center Type I RUs shall be located at the predetermined positions in the user-specific field 2550. For example, the user-specific subfield for a first center Type I RU is the last user-specific subfield in the user-specific field 2550 while the user-specific subfield for a second center Type I RU is the second last user-specific subfield in the user-specific field 2550.

Figure 26:
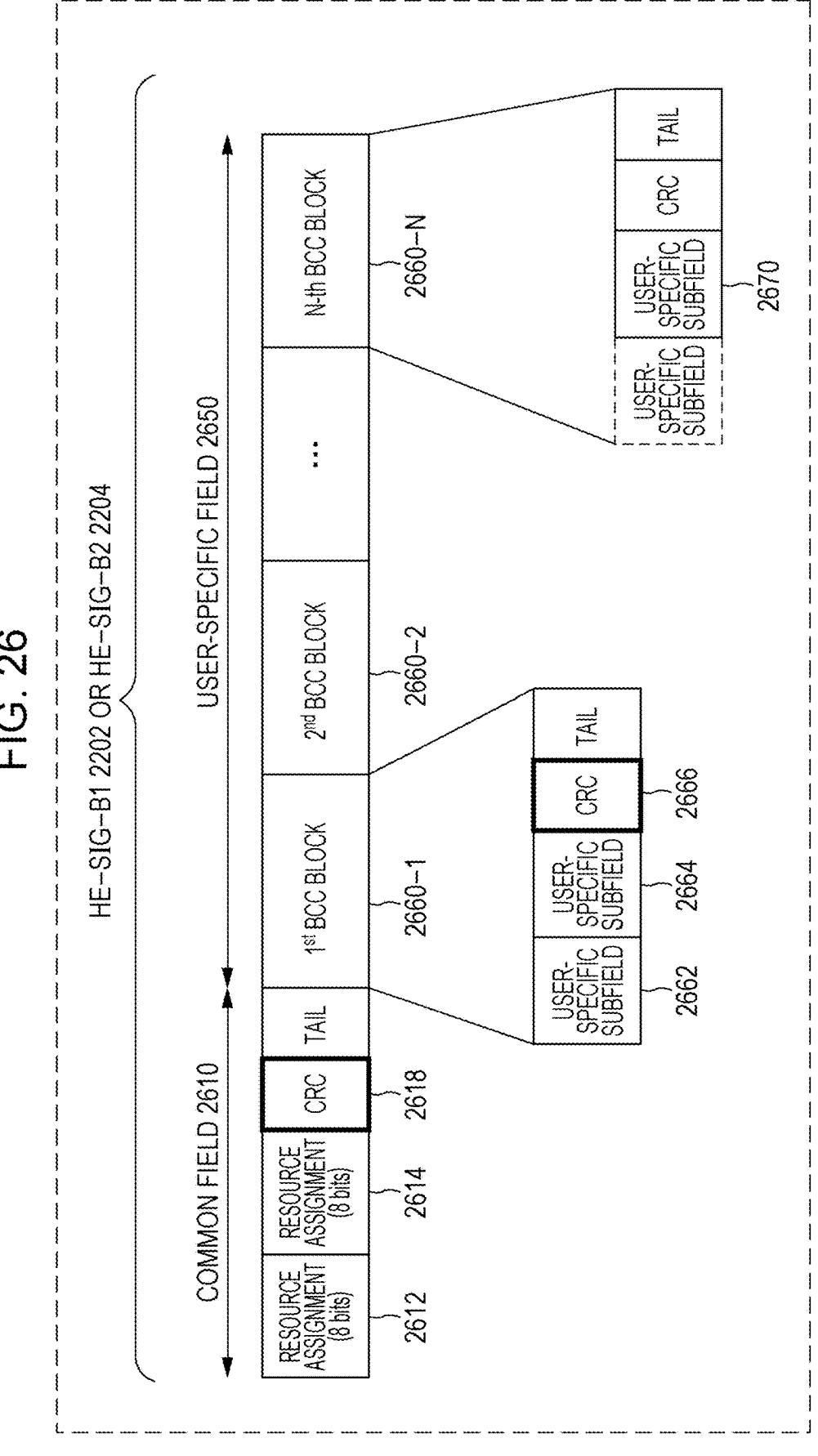
FIG. 26 shows a diagram illustrating a third example format of the HE-SIG-B1 or the HE-SIG-B2 in case of CBW=80 MHz.

FIG. 26 illustrates a third example format of the HE-SIG-B1 2202 or the HE-SIG-B2 2204 in FIG. 22 in case of CBW=80 MHz. The HE-SIG-B1 2202 or the HE-SIG-B2 2204 comprises a common field 2610 and a user-specific field 2650. The common field 2610 comprises a first resource assignment subfield 2612, a second resource assignment subfield 2614, a CRC subfield 2618 and a tail bits subfield. The user-specific field 2650 comprises a plurality of BCC blocks 2660. Each of BCC blocks 2660 except the last BCC block 2660-N comprises a first user-specific subfield, a second user-specific subfield, a CRC subfield and a tail bits subfield. The last BCC block 2660-N may comprise a single user-specific subfield. Each of user-specific subfields in the user-specific field 2650 carries per-user allocation information.

The first resource assignment subfield 2612, the second resource assignment subfield 2614 and each of user-specific subfields are defined in the same way as their respective counterparts in FIG. 24.

According to the present disclosure, whether the CRC subfield 2618 in the common field 2610 is masked by a predefined binary sequence (i.e., whether a XOR (Exclusive OR) is applied to the CRC subfield 2618 and a predefined binary sequence) is used to indicate whether there is a user-specific subfield for the center Type I RU in the user-specific field 2650. For example, if the CRC subfield 2618 in the common field 2610 is not masked with a predefined binary sequence, there is no user-specific subfield for the center Type I RU in the user-specific field 2650. Otherwise there is a user-specific subfield for the center Type I RU in the user-specific field 2650.

Alternatively, instead of the CRC subfield 2618 in the common field 2610, whether the CRC subfield of a specific BCC block in the user-specific field 2650 is masked by a predefined binary sequence is used to indicate whether there is a user-specific subfield for the center Type I RU in the user-specific field 2650. For example, if the CRC subfield 2666 of the first BCC block 2660-1 is not masked by a predefined binary sequence, there is no user-specific subfield for the center Type I RU in the user-specific field 2650. Otherwise there is a user-specific subfield for the center Type I RU in the user-specific field 2650.

If a user-specific subfield for the center Type I RU is present in the user-specific field 2650, its position in the user-specific field 2650 shall be predetermined. For example, the user-specific subfield for the center Type I RU is the last user-specific subfield 2670 in the user-specific field 2650.

According to the present disclosure, the number of user-specific subfields in the user-specific field 2650 except the user-specific subfield for the center Type I RU can be derived from the first resource assignment subfield 2612 and the second resource assignment subfield 2614 in the common field 2610.

Compared with the second example format of the HE-SIG-B1 2202 or the HE-SIG-B2 2204 as illustrated in FIG. 25, the third example format as illustrated in FIG. 26 does not need a signaling subfield in the common field to signal the presence of user-specific subfield for the center Type I RU in the user-specific field. In other words, the signaling bits required by the third example format is reduced compared with the second example format.

In case of CBW=160 MHz or 80+80 MHz, whether the CRC subfield 2618 in the common field 2610 (or the CRC subfield 2666 in the user-specific field 2650) is masked by one of the three predefined binary sequences is used to indicate whether there is a user-specific subfield for each of the two center Type I RUs in the user-specific field 2650. For example, if the CRC subfield 2618 in the common field 2610 (or the CRC subfield 2666 in the user-specific field 2650) is not masked by one of three predefined binary sequences, there is no user-specific subfield for the center Type I RU in the user-specific field 2650. If the CRC subfield 2618 in the common field 2610 (or the CRC subfield 2666 in the user-specific field 2650) is masked by a first predefined binary sequence, there is a user-specific subfield for a first center Type I RU in the user-specific field 2650. If the CRC subfield 2618 in the common field 2610 (or the CRC subfield 2666 in the user-specific field 2650) is masked by a second predefined binary sequence, there is a user-specific subfield for a second center Type I RU in the user-specific field 2650. If the CRC subfield 2618 in the common field 2610 (or the CRC subfield 2666 in the user-specific field 2650) is masked by a third predefined binary sequence, there is a user-specific subfield for each of the two center Type I RUs in the user-specific field 2650. If the user-specific subfield for only one of the two center Type I RUs is present in the user-specific field 2650, its position in the user-specific field 2650 shall be predetermined. For example, the user-specific subfield for the center Type I RU is the last user-specific subfield in the user-specific field 2650. If the user-specific subfield for each of the two center Type I RUs is present in the user-specific field 2650, the two user-specific subfields for the center Type I RUs shall be located at the predetermined positions in the user-specific field 2650. For example, the user-specific subfield for a first center Type I RU is the last user-specific subfield in the user-specific field 2650; while the user-specific subfield for a second center Type I RU is the second last user-specific subfield in the user-specific field 2650.

In the foregoing embodiments, the present disclosure is configured with hardware by way of example, but the disclosure may also be provided by software in cooperation with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

This disclosure can be applied to a method for formatting and transmitting resource assignment information in a wireless communications system.

What is claimed is:

1. An integrated circuit, comprising:

signal generation circuitry which, in operation, generates a signal that contains a preamble and a data field, the preamble including a common field and a user specific field; and control circuitry which, in operation, controls transmitting of the signal, wherein a resource assignment subfield in the common field indicates a plurality of resource units (RUs) in a frequency domain, and the user specific field includes a plurality of user fields, each of the plurality of RUs being allocated to a user field or a group of user fields for multiuser-multiple input multiple output (MU-MIMO) transmission in the plurality of user fields, respectively, and the ordering of the plurality of user fields in the user specific field is determined based on the resource assignment subfield such that the user field and the group of user fields in the plurality of the user fields are in order of increasing frequency of the respective allocated RUs.

2. The integrated circuit according to claim 1, comprising:

at least one input coupled to the signal generation circuitry, wherein the at least one input, in operation, inputs data; and at least one output coupled to the control circuitry, wherein the at least one output, in operation, outputs data to be transmitted.

3. The integrated circuit according to claim 1, wherein each of the plurality of the user fields contains a user identifier.

4. The integrated circuit according to claim 1, wherein each of the plurality of RUs is formed of a subset of a plurality of tones that are identified by tone indices in the frequency domain.

5. The integrated circuit according to claim 4, wherein each of the plurality of RUs is specified by a start tone index and an end tone index of the subset of the plurality of tones.

6. The integrated circuit according to claim 1, wherein the plurality of user fields include a first user field and a second user field, and a start tone index of a first RU corresponding to the first user field is next to an end tone index of a second RU corresponding to the second user field.

7. The integrated circuit according to claim 1, wherein an unused RU of the plurality of RUs is indicated by dummy information.

8. The integrated circuit according to claim 1, wherein the preamble includes a first channel field for a first subband channel and a second channel field for a second subband channel.

9. The integrated circuit according to claim 8, wherein the first channel field includes the common field and the user specific field, and the second channel field includes another common field and another user specific field.

10. The integrated circuit according to claim 1, wherein the common field includes a center RU subfield indicating whether a center type RU is allocated.

11. The integrated circuit according to claim 10, wherein the center type RU corresponds to a last user field of the plurality of user fields.

12. The integrated circuit according to claim 1, wherein a RU assignment of the plurality of RUs is determined based on quality information of the plurality of RUs.

13. A process controlled by an integrated circuit, the process comprising:

generating a signal that contains a preamble and a data field, the preamble including a common field and a user specific field; and transmitting the signal, wherein a resource assignment subfield in the common field indicates a plurality of resource units (RUS) in a frequency domain, and the user specific field includes a plurality of user fields, each of the plurality of RUs being allocated to a user field or a group of user fields for multiuser-multiple input multiple output (MU-MIMO) transmission in the plurality of user fields, respectively, and the ordering of the plurality of user fields in the user specific field is determined based on the resource assignment subfield such that the user field and the group of user fields in the plurality of the user fields are in order of increasing frequency of the respective allocated RUs.

14. The process according to claim 13, wherein each of the plurality of the user fields contains a user identifier.

15. The process according to claim 13, wherein the preamble includes a first channel field for a first subband channel and a second channel field for a second subband channel.

16. A non-transitory computer-readable medium having contents which cause processing circuitry to perform a method, the method comprising:

generating a signal that contains a preamble and a data field, the preamble including a common field and a user specific field; and transmitting the signal, wherein a resource assignment subfield in the common field indicates a plurality of resource units (RUs) in a frequency domain, and the user specific field includes a plurality of user fields, each of the plurality of RUs being allocated to a user field or a group of user fields for multiuser-multiple input multiple output (MU-MIMO) transmission in the plurality of user fields, respectively, and the ordering of the plurality of user fields in the user specific field is determined based on the resource assignment subfield such that the user field and the group of user fields in the plurality of the user fields are in order of increasing frequency of the respective allocated RUs.

17. The non-transitory computer-readable medium according to claim 16, wherein the contents comprise configuration settings.

18. The non-transitory computer-readable medium according to claim 16, wherein each of the plurality of the user fields contains a user identifier.

19. The non-transitory computer-readable medium according to claim 16, wherein the preamble includes a first channel field for a first subband channel and a second channel field for a second subband channel.

* * * * *